(12) United States Patent (10) Patent No.: US 8,700,443 B1
Murray et al. (45) Date of Patent: Apr. 15, 2014

(54) SUPPLY RISK DETECTION

(75) Inventors: Jason W. Murray, Bellevue, WA (US);
Devesh Mishra, Issaquah, WA (US);
Eric M Mack, Seattle, WA (US); Jeffrey B. Maurer, Issaquah, WA (US); Minshu Xu, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/172,720

(22) Filed: Jun. 29, 2011

(51) Int. Cl.
*G06Q 10/00* (2012.01)

(52) U.S. Cl.
USPC .................................................. 705/7.31

(58) Field of Classification Search
USPC ......................................................... 705/7.31
See application file for complete search history.

(56) References Cited

U.S. PATENT DOCUMENTS

| | | | | |
|---|---|---|---|---|
| 6,144,945 | A * | 11/2000 | Garg et al. | 705/28 |
| 6,151,582 | A * | 11/2000 | Huang et al. | 705/7.25 |
| 6,834,266 | B2 | 12/2004 | Kumar et al. | |
| 6,976,001 | B1 | 12/2005 | Levanoni et al. | |
| 7,092,929 | B1 * | 8/2006 | Dvorak et al. | 705/28 |
| 7,437,308 | B2 | 10/2008 | Kumar et al. | |
| 7,437,323 | B1 | 10/2008 | Valkov et al. | |
| 7,890,360 | B1 * | 2/2011 | Johnson et al. | 705/7.12 |
| 8,055,520 | B2 | 11/2011 | Baumann et al. | |
| 2002/0072988 | A1 | 6/2002 | Aram | |
| 2002/0188499 | A1 * | 12/2002 | Jenkins et al. | 705/10 |
| 2003/0009410 | A1 * | 1/2003 | Ramankutty et al. | 705/37 |
| 2003/0018513 | A1 * | 1/2003 | Hoffman et al. | 705/10 |
| 2003/0033179 | A1 * | 2/2003 | Katz et al. | 705/7 |
| 2003/0074251 | A1 | 4/2003 | Kumar et al. | |
| 2003/0101107 | A1 * | 5/2003 | Agarwal et al. | 705/28 |
| 2003/0110104 | A1 * | 6/2003 | King et al. | 705/28 |
| 2003/0149578 | A1 * | 8/2003 | Wong | 705/1 |
| 2003/0216969 | A1 * | 11/2003 | Bauer et al. | 705/22 |
| 2004/0068455 | A1 * | 4/2004 | Jacobus et al. | 705/36 |
| 2004/0078259 | A1 * | 4/2004 | Allan et al. | 705/10 |
| 2004/0172321 | A1 | 9/2004 | Vemula et al. | |
| 2004/0172341 | A1 | 9/2004 | Aoyama et al. | |
| 2004/0230474 | A1 * | 11/2004 | Dogan et al. | 705/10 |

(Continued)

OTHER PUBLICATIONS

Choi, et al. "On Measuring Supplier Performance Under Vendor-Managed-Inventory Programs in Capacitated Supply Chains." Manufacturing & Service Operations Management, Winter 2004, vol. 6, No. 1.*

(Continued)

*Primary Examiner* — Susanna M Meinecke Diaz
(74) *Attorney, Agent, or Firm* — Robert C. Kowert; Meyertons, Hood, Kivlin, Kowert & Goetzel, P.C.

(57) ABSTRACT

Systems and methods for supply risk detection are disclosed. In some embodiments, a method includes identifying fulfillment-related features corresponding to an item to be stored in inventory. The method also includes selecting a subset of the fulfillment-related features that is correlated with a supply constraint associated with the item. For example, in some cases the correlation is based on historical supply constraint data. The method further includes building a supply risk early detection model based, at least in part, upon the subset fulfillment-related features and evaluating the model to determine a probability that a third-party vendor will suffer a shortage of the item, as well as an expected duration of the shortage. Upon evaluation of the model, the method may include creating a purchasing plan for the item that takes into account the probability of the shortage and the expected duration of the shortage.

18 Claims, 20 Drawing Sheets

(56) References Cited

U.S. PATENT DOCUMENTS

| | | | |
|---|---|---|---|
| 2004/0236591 A1* | 11/2004 | Johnson et al. | 705/1 |
| 2005/0033706 A1* | 2/2005 | Krikler et al. | 705/400 |
| 2005/0177435 A1* | 8/2005 | Lidow | 705/22 |
| 2005/0216429 A1* | 9/2005 | Hertz et al. | 707/1 |
| 2005/0222888 A1* | 10/2005 | Hosoda et al. | 705/8 |
| 2005/0256752 A1* | 11/2005 | Ramachandran et al. | 705/7 |
| 2006/0111960 A1* | 5/2006 | Chess et al. | 705/10 |
| 2006/0235557 A1* | 10/2006 | Knight et al. | 700/103 |
| 2006/0282346 A1* | 12/2006 | Kernodle et al. | 705/28 |
| 2007/0143157 A1 | 6/2007 | Sussman et al. | |
| 2007/0270990 A1* | 11/2007 | Katircioglu | 700/99 |
| 2007/0282669 A1* | 12/2007 | Bachman et al. | 705/10 |
| 2008/0015721 A1* | 1/2008 | Spearman | 700/99 |
| 2008/0147477 A1* | 6/2008 | McCormick | 705/10 |
| 2008/0147486 A1 | 6/2008 | Wu | |
| 2009/0125385 A1* | 5/2009 | Landvater | 705/10 |
| 2009/0222359 A1* | 9/2009 | Henry | 705/28 |
| 2009/0327027 A1* | 12/2009 | Bateni et al. | 705/10 |
| 2010/0100421 A1* | 4/2010 | Bateni et al. | 705/10 |
| 2010/0138273 A1 | 6/2010 | Bateni et al. | |
| 2010/0205039 A1 | 8/2010 | Basak et al. | |
| 2010/0332407 A1* | 12/2010 | Grieve et al. | 705/332 |
| 2012/0054076 A1* | 3/2012 | Wu et al. | 705/28 |
| 2012/0173304 A1* | 7/2012 | Hosoda et al. | 705/7.31 |
| 2012/0330772 A1* | 12/2012 | Choe et al. | 705/26.1 |

OTHER PUBLICATIONS

Nagali, et al. "Procurement Risk Management (PRM) at Hewlett-Packard Company." Interfaces, vol. 38, No. 1, pp. 51-60, Jan./Feb. 2008.*

Chiles et al. "An Analysis of Current Supply Chain Best Practices in the Retail Industry with Case Studies of Wal-Mart and Amazon.com." Submitted to the Engineering Systems Division in Partial Fulfillment of the Requirements for the Degree of Master of Engineering in Logistics at the Massachusetts Institute of Technology (Jun. 2005).*

Benjamin W. Wah and Tao Wang, "Simulated Annealing with Asymptotic Convergence for Nonlinear Constrained Global Optimization," 2004, pp. 1-15.

Benjamin W. Wah, et al., "Hybrid Constrained Simulated Annealing and Genetic Algorithms for Nonlinear Constrained Optimization," 2001, pp. 1-8.

Benjamin W. Wah, et al., "The Theory of Discrete Lagrange Multipliers for Nonlinear Discrete Optimization," Research supported by National Science Foundation Grant NSF MIP 96-32316. Principles and Practice of Constraint Programming, Springer-Verlag, Oct. 1999, pp. 28-42.

Benjamin W. Wah, et al., "Constrained Genetic Algorithms and their Applications in Nonlinear Constrained Optimization," Proc. 12th International Conference on Tools with ArticialInteliigence, Nov. 2000, pp. 1-8.

Benjamin W. Wah, et al., "Simulated annealing with asymptotic convergence for nonlinear constrained optimization," Received: Aug. 20, 2005 / Accepted: Oct. 16, 2006, © Springer Science+Business Media B.v. 2006, pp. 1-37.

Zhe Wu, "The Theory and Applications of Discrete Constrained Optimization Using Lagrange Mul tipliers," 2000 pp. 1-221.

U.S. Appl. No. 12/981,382, filed Dec. 29, 2010, Maomao Chen, et al.
U.S. Appl. No. 13/172,728, filed Jun. 29, 2011, Jason W. Murray, et al.
U.S. Appl. No. 13/211,158, Aug. 16, 2011, Aniket Ajit Prabhune, et al.
U.S. Appl. No. 13/524,897, Jun. 15, 2012, Fedor Zhdanov, et al.
U.S. Appl. No. 13/172,733, Jun. 29 2011, Eric M. Mack, et al.

* cited by examiner

'US Shoes' Product Group Detail

Current Buying Policies for Results

Instock Percentage: (Aug 29 2010 - Sept 17 2010) >= 93% (Sept 26 2010 - Oct 10 2010) >= 91% ← 410
Cost / COGS (Aug 29 2010 - Oct 10 2010) minimization target
Applicable S&OP (Ops) constraints:
GLProductGroup: 11 Sortable On-Hand Capacity: 10MM units Nonsortable On-Hand Capacity: 1.5MM units ← 420

There is currently a processing request to activate new buying policies

View Analysis Requests

| | Date Requested | Status | Description |
|---|---|---|---|
| ☐ | Sept 1 2010 | Processing | Trying new instock const |
| ☐ | Sept 1 2010 | Complete | Holiday Baseline |
| ☐ | Aug 29 2010 | Complete | Max on-hand constraint test |

View:

Make new analysis request ← 430

Planning Region: US

Buying Policies & SOP Capacity Constraints

A: Current Production Settings Constraint Details Run Details

| Retail Policy | | | Week May 8 2011 | Week May 15 2011 | Week May 22 2011 | Week May 29 2011 | Week Jun 5 2011 | Week Jun 12 2011 | Week Jun 19 2011 | Week Jun 26 2011 |
|---|---|---|---|---|---|---|---|---|---|---|
| Mean Forecast Multiplier | | | 1.97 | 1.97 | 1.97 | 1.97 | 1.97 | 1.97 | 1.97 | 1.97 |
| Capacity Constraint | IOG - GL Pairs | Sort-Type | | | | | | | | |

No Capacity Constraints.

B: 'Baseline for pbs-ce-he-other-simulation' (COMPLETED) Constraint Details Run Details
Run ineligible for promotion

| Retail Policy | | | Week May 8 2011 | Week May 15 2011 | Week May 22 2011 | Week May 29 2011 | Week Jun 5 2011 | Week Jun 12 2011 | Week Jun 19 2011 | Week Jun 26 2011 |
|---|---|---|---|---|---|---|---|---|---|---|
| Mean Forecast Multiplier | | | 1.6 | 1.6 | 1.6 | 1.6 | 1.6 | 1.6 | 1.6 | 1.6 |
| Capacity Constraint | IOG - GL Pairs | Sort-Type | | | | | | | | |

No Capacity Constraints.

Predictions

| | Metric | Graph | | Week May 8 2011 | Week May 15 2011 | Week May 22 2011 | Week May 29 2011 | Week Jun 5 2011 | Week Jun 12 2011 | Week Jun 19 2011 | Week Jun 26 2011 |
|---|---|---|---|---|---|---|---|---|---|---|---|
| ▸ | Total On-hand Inventory (Units) | | A | 388385.00 | 483390.00 | 535509.00 | 552844.00 | 560377.00 | 556024.00 | 545198.00 | 532600.00 |
| | | | B | 371066.00 | 398224.00 | 405439.00 | 409863.00 | 409932.00 | 401999.00 | 393334.00 | 382664.00 |
| ▸ | Total On-hand Inventory (USD) | | A | 297100000.00 | 374586000.00 | 413498000.00 | 426566000.00 | 430101000.00 | 426184000.00 | 422282000.00 | 415613000.00 |
| | | | B | 289005000.00 | 320785000.00 | 327656000.00 | 328706000.00 | 328021000.00 | 320468000.00 | 314907000.00 | 309270000.00 |

FIG. 7

US Simulation Groups / Simulation Group Detail / Prediction Comparison

'pbs-us-pets-simulation' Prediction Comparison

Buying Policies & SOP Capacity Constraints

Current Production Settings: Constraint Details: Run Details

| Retail Policy | | | Week May 8 2011 | Week May 15 2011 | Week May 22 2011 | Week May 29 2011 | Week Jun 5 2011 | Week Jun 12 2011 | Week Jun 19 2011 | Week Jun 26 2011 |
|---|---|---|---|---|---|---|---|---|---|---|
| Mean Forecast Multiplier | | | 1.874 | 1.874 | 1.874 | 1.874 | 1.874 | 1.874 | 1.874 | 1.874 |
| Capacity Constraint | IOG - GL Pairs | Sort-Type | | | | | | | | |
| Maximum Arrivals | (1, 199) | fullcase | 22211 | 25482 | 20561 | 20561 | 19802 | 19800 | 17248 | 20298 |
| Maximum Arrivals | (1, 199) | noncon | 5418 | 6215 | 5016 | 5016 | 4850 | 4841 | 4217 | 4962 |
| Maximum Arrivals | (1, 199) | sortable | 76663 | 95310 | 102511 | 102511 | 99307 | 99307 | 86491 | 101797 |

Predictions

| Metric | Graph | Week May 8 2011 | Week May 15 2011 | Week May 22 2011 | Week May 29 2011 | Week Jun 5 2011 | Week Jun 12 2011 | Week Jun 19 2011 | Week Jun 26 2011 |
|---|---|---|---|---|---|---|---|---|---|
| ▶ Total On-hand Inventory (Units) | ☐ | 421133.00 | 446501.00 | 457760.00 | 453127.00 | 447956.00 | 446889.00 | 441884.00 | 436272.00 |
| ▶ Total On-hand Inventory (USD) | ☑ | 5894490.00 | 6284590.00 | 6445780.00 | 6351220.00 | 6278330.00 | 6282560.00 | 6203770.00 | 6107040.00 |

Planning Region: US

Capacity Constraints

Pets Sortable: Maximum Arrivals

| Metric | May 8 2011 | May 15 2011 | May 22 2011 | May 29 2011 | Jun 5 2011 | Jun 12 2011 | Jun 19 2011 | Jun 26 2011 |
|---|---|---|---|---|---|---|---|---|
| Total Arrivals | 62564.6 | 84456.5 | 67933.7 | 63937.4 | 67016.4 | 63512.7 | 59643.1 | 63880.3 |
| Limit | 76663 | 95310 | 102511 | 102511 | 99307 | 99307 | 86491 | 101797 |
| Violation | 0 | 0 | 0 | 0 | 0 | 0 | 0 | 0 |

Pets Fullcase: Maximum Arrivals

| Metric | May 8 2011 | May 15 2011 | May 22 2011 | May 29 2011 | Jun 5 2011 | Jun 12 2011 | Jun 19 2011 | Jun 26 2011 |
|---|---|---|---|---|---|---|---|---|
| Total Arrivals | 12748.2 | 22015.1 | 13326.3 | 12301.2 | 15088.4 | 12727.6 | 11612 | 11929.1 |
| Limit | 22211 | 25482 | 20561 | 20561 | 19802 | 19800 | 17248 | 20298 |
| Violation | 0 | 0 | 0 | 0 | 0 | 0 | 0 | 0 |

Pets Noncon: Maximum Arrivals

| Metric | May 8 2011 | May 15 2011 | May 22 2011 | May 29 2011 | Jun 5 2011 | Jun 12 2011 | Jun 19 2011 | Jun 26 2011 |
|---|---|---|---|---|---|---|---|---|
| Total Arrivals | 5402.05 | 6355.45 | 2852.7 | 2870.25 | 4602.65 | 4632.05 | 3256.3 | 2933.85 |
| Limit | 5418 | 6215 | 5016 | 5016 | 4850 | 4841 | 4217 | 4962 |
| Violation | 0 | 140.45 | 0 | 0 | 0 | 0 | 0 | 0 |

Graphs

Capacity Constraint Details for 'Automotive'

Affected Simulation Groups de-auto-fixed-cr-simulation

Edit instructions:

Enter the intended inbound arrival capacity constraint override for each week and sort type desired. To remove an existing constraint override, replace it with "N/A" or whitespace.

Capacity Constraints

Download CSV

| Week | Sort Type | S&OP | Preplanning Percentage | Preplanning Allocation | Override | Final Preplanning Allocation |
|---|---|---|---|---|---|---|
| 2011-05-01 | sortable | N/A | 100.0 | N/A | N/A | N/A |
|  | noncon | N/A | 100.0 | N/A | 13245 | N/A |
| 2011-05-08 | sortable | 8587 | 100.0 | 8587 | N/A | 8587 |
|  | noncon | 1312 | 100.0 | 1312 | N/A | 1312 |
| 2011-05-15 | sortable | 15839 | 100.0 | 15839 | N/A | 15839 |
|  | noncon | 5758 | 100.0 | 5758 | N/A | 5758 |
| 2011-05-22 | sortable | 16366 | 100.0 | 16366 | N/A | 16366 |
|  | noncon | 5754 | 100.0 | 5754 | N/A | 5754 |
| 2011-05-29 | sortable | 13717 | 100.0 | 13717 | N/A | 13717 |
|  | noncon | 5071 | 100.0 | 5071 | N/A | 5071 |

New Analysis Request for 'pbs-us-pets-simulation'

Planning Region: US

This run will create a new data set.

Description:

'pbs-us-pets-simulation' target: Fixed CR Mean Forecast Multiplier
'pbs-us-pets-subsave-simulation' target: Fixed CR Mean Forecast Multiplier

1600

| | Simulation Group Constraints | | Capacity Group Constraints | | |
|---|---|---|---|---|---|
| | pbs-us-pets-simulation | pbs-us-pets-subsave-simulation | Pets (Maximum Arrivals) | | |
| WEEK | Mean Forecast Multiplier | Mean Forecast Multiplier | sortable | fullcase | noncon |
| May 8 2011 | 1.874 | 1.785 | 76663 | 22211 | 5418 |
| May 15 2011 | 1.874 | 1.785 | 95310 | 25482 | 6215 |
| May 22 2011 | 1.874 | 1.785 | 102511 | 20561 | 5016 |
| May 29 2011 | 1.874 | 1.785 | 102511 | 20561 | 5016 |
| Jun 5 2011 | 1.874 | 1.785 | 99307 | 19802 | 4850 |
| Jun 12 2011 | 1.874 | 1.785 | 99307 | 19800 | 4841 |
| Jun 19 2011 | 1.874 | 1.785 | 86491 | 17248 | 4217 |
| Jun 26 2011 | 1.874 | 1.785 | 101797 | 20298 | 4962 |

Add Another Week | Remove Last Week

Note: Ongoing optimization runs will carry over the last specified week's policies into future weeks, once promoted to production. This does not include capacity constraints which cannot be promoted by Preplanning systems currently.

Request Analysis

FIG. 17

SUPPLY RISK DETECTION

BACKGROUND

In order to offer customers a wide selection of items readily available for delivery, a merchant (whether engaging in electronic or conventional "brick and mortar" commerce) may hold various quantities of such items within one or more inventory facilities. Keeping items in inventory may serve to buffer variations in customer demand, or in a manufacturer or distributor's ability to supply various items. For example, different items offered for sale by the merchant may have different manufacturer or vendor lead times. Holding quantities of such items in inventory may enable the merchant to offer a more consistent availability of these items to customers.

As part of its operations, a merchant will generally attempt to ensure that its inventory on hand is sufficient to cover expected customer order volumes for a particular period of time. Typically, these techniques focus on making sure that there is enough inventory on hand to meet projected demand. However, storing inventory is not without expenses. For example, providing and maintaining a physical facility in which to store the inventory presents recurring infrastructure costs directly attributable to the inventory items stored in the facility. Further, while items are in storage awaiting sale, debt or capital costs associated with the items may accumulate. Items being held in inventory may also depreciate, become obsolete, expire or spoil (e.g., in the case of perishable items), become damaged, etc.

When these various types of inventory holding costs are taken into account, storing too much inventory can present financial concerns. To address these concerns, certain merchants employ so-called "just-in-time" (JIT) strategies to inventory management and purchasing. These types of strategies, when properly implemented, attempt to ensure that the merchant purchases and stocks just the right amount of inventory at the right time to satisfy demand, thus minimizing associated costs.

BRIEF DESCRIPTION OF THE DRAWINGS

FIGS. 4-18 are screenshots of a user interface of an inventory planning and control software module according to some embodiments.

Figure 1:
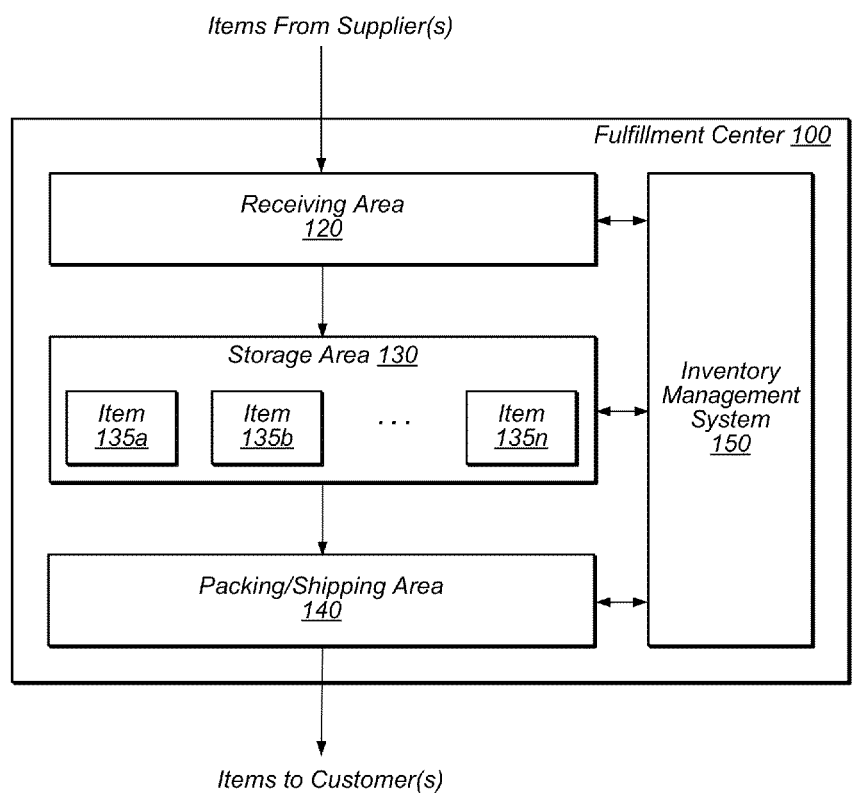
FIG. 1 is a block diagram illustrating a fulfillment center according to some embodiments.

While the specification is susceptible to various modifications and alternative forms, specific embodiments thereof are shown by way of example in the drawings and will herein be described in detail. It should be understood, however, that the drawings and detailed description thereto are not intended to limit the appended claims to the particular form disclosed, but on the contrary, the intention is to cover all modifications, equivalents and alternatives falling within the spirit and scope of the specification.

DETAILED DESCRIPTION OF EMBODIMENTS

Introduction

Retail merchants may sometimes employ "just-in-time" (JIT) or other "lean" inventory strategies to the purchasing and stocking of items in inventory. These strategies aim to determine the exact amount of inventory that will be needed at a certain point in time in order to satisfy the expected or predicted customer demand. By purchasing only that determined amount, costs normally associated with holding items in inventory may be reduced. Generally speaking, JIT strategies are applicable during a large portion of the calendar year, where most fulfillment-related variables (e.g., customer demand, item availability, etc.) are approximately at a "steady state." There are situations, however, where at least some of these variables may depart significantly from their normal conditions. For example, during periods of time surrounding a merchant's seasonal sales (e.g., Black Friday, Cyber Monday, Christmas, "fourth quarter (Q4)," etc.), elements such as customer demand variability, vendor supply availability, opportunity cost of being out-of-stock, risk of being overstocked, and/or a fulfillment center's capacity consumption can vary drastically compared to the rest of the year. Due to the increased load that is placed on a merchant's fulfillment system during "peak" periods, it may be advantageous to depart from the "off-peak," JIT approach, in a manner that reduces the financial costs of purchasing and storing suboptimal amounts of inventory—e.g., too much or too little inventory.

Accordingly, in some embodiments, a method may include implementing a just-in-time purchasing plan for an item to be stocked in inventory prior to arrival of a seasonal purchasing period. In some cases, a seasonal purchasing period may precede a seasonal sales period (e.g., the seasonal purchasing period may include several days or weeks leading up to a holiday or the like when the increased sales will actually take place). In other cases, the seasonal purchasing period may overlap or at least partially coincide with the seasonal sales period. The method may include receiving, via a planning portal, an indication of one or more business goals to be achieved during the seasonal purchasing period and receiving, via the planning portal, an indication of one or more operational constraints and/or risks corresponding to the seasonal purchasing period. The method may also include evaluating a financial cost function with a multi-constraint optimization model to provide a seasonal purchasing plan for the item during the seasonal purchasing period based, at least in part, on the one or more business goals and the one or more operational constraints and/or risks, where at least one of the one or more business goals or the one or more operational constraints or risks causes the seasonal purchasing plan to be different from the just-in-time purchasing plan. The method may further include displaying the seasonal purchasing plan via the planning portal and, in response to a selection of the seasonal purchasing plan, causing an automatic purchasing of the item that implements the seasonal purchasing plan during the seasonal purchasing period.

In other embodiments, a system may include at least one processor and a memory coupled to the at least one processor, where the memory stores program instructions. The program instructions may be executable by the at least one processor to cause the system to receive an indication of one or more business goals corresponding to an item to be stocked in inventory during a specified time period, where at least one of the one or more business goals is different during the specified time period than outside of the specified time period. The program instructions may also be executable to cause the system to receive an indication of one or more operational constraints and/or risks corresponding to the specified time period, where at least one of the one or more operational constraints or risks is different during the specified time period than outside of the specified time period. The program instructions may further cause the system to evaluate a financial cost function with a multi-constraint optimization model to provide a purchasing plan for the item during the specified time period based, at least in part, on the one or more business goals and the one or more operational constraints and/or risks, where at least one of the one or more business goals or the one or more operational constraints or risks causes the purchasing plan to depart from another purchasing plan employed outside the specified time period. In addition, the program instructions may also cause automatic purchasing of the item to implement the purchasing plan during the specified time period.

In yet other embodiments, a non-transitory computer-readable storage medium may have program instructions stored thereon that, upon execution by a computer system, may cause the computer system to receive an indication of one or more business goals and operational constraints and/or risks corresponding to an item to be stocked in inventory during a specified time period, where at least one of the one or more business goals and operational constraints or risks is different during the specified time period than outside of the specified time period. The program instructions, upon execution by the computer system, may also cause automatic purchasing of the item to implement the purchasing plan during the specified time period by evaluating a financial cost function with a multi-constraint optimization model based, at least in part, on the one or more business goals and operational constraints and/or risks, where at least one of the one or more business goals and operational constraints and/or risks causes the purchasing plan to depart from a just-in-time plan employed outside the specified time period.

In the sections that follow, the specification first provides and overview of a typical inventory management system. The specification then discloses an inventory planning and control (IPC) software module, as well as various techniques that may be used for purchasing inventory in anticipation of seasonal sales periods. The specification also describes techniques for detecting the supply risk that may be associated with seasonal purchasing periods. The specification further describes a multiple constraint optimization model that may be used by the inventory planning and control software to implement some of the techniques described herein. Lastly, the specification describes a computer system suitable for implementing systems and methods described herein. It should be noted that the headings used below are for organizational purposes only, and are not meant to be used to limit the scope of the description.

Inventory Management Systems

An embodiment of a fulfillment center configured to store inventory items is illustrated in FIG. 1. As illustrated, fulfillment center 100 includes a receiving area 120, a storage area 130 configured to store an arbitrary number of inventory items 135a-n, and a packing/shipping area 140. The arrangement of the various areas within fulfillment center 100 is depicted functionally rather than schematically. For example, in some embodiments, multiple different receiving areas 120, storage areas 130 and packing/shipping areas 40 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of inventory items 135 from various suppliers and to store them until a customer order specifying particular ones of items 135 is received. The particular items 135 may then be selected from storage and sent to the customer. The general flow of items through fulfillment center 100 is indicated using arrows. Specifically, as illustrated in this example, items 135 may be received from one or more suppliers, such as manufacturers, distributors, wholesalers, etc. at receiving area 120. In various embodiments, items 135 may include merchandise, commodities, perishables, or any suitable type of item depending on the nature of the enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 30. In some embodiments, like items 135 may be stored together in bins, on shelves or via other suitable storage mechanisms, such that all items 135 of a given kind are stored in one location. In other embodiments, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, the corresponding items 135 may be selected or "picked" from storage area 130. In various embodiments, item picking may range from minimally automated to completely automated picking. For example, in one embodiment fulfillment center employees may pick items 135 using written or electronic pick lists derived from customer orders, while in another embodiment conveyor belts and robotics may be used to pick and transfer items 135. After the items 135 corresponding to a particular order are picked, they may be processed at packing/shipping area 140 for delivery to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 135 are picked from storage area 130 and/or processed at packing/shipping area 140, for example to update inventory records to reflect the removal of inventory, to record revenue for the sale or other transaction (e.g., lease, rental, exchange, etc.) and so forth.

The organization and operation of fulfillment center 100 described above is given as an example. In other embodiments, a fulfillment center 100 may be arranged differently and operate differently than described above. For example, some embodiments of fulfillment center 100 may not have a dedicated receiving area 120. In such embodiments received items may be place directly into bins in storage area 130. In general, fulfillment center 100 may employ any organization and operational flow for handling inventory and fulfilling orders.

Generally speaking, the level of inventory of a given item 135 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 135 ordered by a customer is not in stock within fulfillment center 100, the customer may be forced to wait for delivery until that particular item 135 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

However, various costs are typically associated with holding items 135 in storage for any period of time. In some embodiments, holding a unit of an item 135 in storage within storage area 130 may incur incremental storage costs. For example, the cost of providing fulfillment center 1000 in which items 135 may be stored may include recurring real estate costs (e.g., lease costs, debt service, etc.), personnel costs, facilities costs (e.g., utilities, maintenance, etc.) and any other costs associated with fulfillment center 100. In an embodiment, such costs may be incrementally apportioned to a given unit of an item 135 according to an area or volume of storage space occupied by that unit. For example, storage costs may be applied to each unit of each item 135 at a rate of dollars per square/cubic foot of item volume per unit of storage time (day, week, month, etc.). In other embodiments, different cost allocation methods may be employed. For example, in an embodiment the costs of providing special storage or handling, such as refrigeration, controlled atmosphere, etc. may exclusively be allocated to those items 135 that require such measures, rather than averaging those costs across all items 135. Similarly, in an embodiment, storage may include temporary capacity (e.g., short-term leased space, seasonal overflow capacity, etc.) as well as permanent capacity (e.g., owned space, year-round capacity, etc.), each of which may have different cost characteristics. Correspondingly, in some such embodiments items 135 stored within a particular type of facility may exclusively incur costs of the particular type of facility according to their storage utilization (e.g., area, volume, etc.). Alternatively, storage costs may be allocated to items 135 based upon their value or sales volume as opposed to their size. In some embodiments, additional costs associated with obtaining a given item 135, such as transportation/handling costs charged by a supplier or incurred by eventual shipment to a customer, may be included within storage costs for that given item 135.

In addition to storage costs, holding a unit of an item 135 in storage may also result in capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Depending on the accounting scheme used to manage the costs of inventory, a cost of debt or other time-value-of-money cost (also referred to as an economic cost) may be associated with the price paid for a given unit of an item 135. For example, in an embodiment an effective annual interest rate of 6% may be applied to the price paid for a unit of inventory and may continue to accrue until that unit is sold or otherwise disposed of. In some cases, economic costs may be applied to storage costs in addition to the price paid for a unit of inventory. Further, negative economic costs may also be associated with units of items 135. For example, a supplier may offer a rebate for an item 135 that effectively reduces its cost.

Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. In some embodiments, two or more of the costs described herein may be combined or added to make up an item's holding cost. In some cases, such holding costs may be expressed as a fixed dollar amount (e.g., $5.00). In other cases, holding costs may be expressed as a dollar amount over a period of time (e.g., $0.50/week). In addition, at least some of items 135 may also depreciate, expire, spoil and/or become obsolete. For example, in some embodiments, one or more of items 135 may be consumable or perishable products (e.g., food, drink, medicine, chemicals, etc.) that have expiration dates or shelf lives. Generally, a product's shelf life is associated with its quality, whereas the product's expiration is related to its safety (e.g., safe to use or consume). Accordingly, after the shelf life of a product has passed, it may still be safe (i.e., it may not have actually expired yet) although its quality is no longer guaranteed. As a practical matter, for some types of products, shelf lives and expiration dates may be used interchangeably.

When deciding how much inventory to purchase for a particular planning period, a merchant may attempt to balance the benefits of holding sufficient inventory to satisfy customer demand against the potential harm of holding too much inventory and incurring some of the costs outlined above. An "overage cost" for an item is the cost a merchant incurs by purchasing one more unit than would otherwise have been purchased if the exact demand for that item had been known. An "underage cost" of the same item is the cost that the merchant incurs by purchasing one fewer unit of the item than would be purchased if the exact demand were known. Ordering one more unit of the item generally increases the probability of overage and decreases the probability of underage, whereas ordering one less unit generally increases the probability of underage and decreases the probability of overage.

A merchant may attempt to minimize (or reduce) the underage and overage costs, at least during steady state periods. Inventory for an item may be purchased according to a critical ratio (CR). The critical ratio for a particular item is a parameter corresponding to the probability of remaining in stock for the item throughout a planning period given a demand forecast for the planning period. Using a higher value for critical ratio will typically result in a higher target inventory level, and a lower critical ratio value will typically lead to a lower target inventory level for the planning period. A purchasing plan may be produced for a particular item according to a particular critical ratio and demand forecast. The purchasing plan will indicate to a buy a quantity of the item to meet the corresponding target inventory level taking into account inventory already on hand or already on order.

During "peak" periods, however, the merchant may choose to artificially adjust the critical ratio relative to steady state periods to account for demand variability and other factors; thus allowing a fulfillment system to effectively perform an "early stock up" of the item. Traditionally, the task of adjusting critical ratios has been an ad hoc process. A person in charge of a particular retail item may directly or indirectly make adjustments to CR as a tuning parameter to attempt to compensate for variabilities that arise at different times during the year, such as during a holiday season. Once the appropriate CR is determined, it is then possible to calculate a re-order quantity based in part on the new CR and the demand forecast for the item.

An Inventory Planning and Control Software Module

Figure 2:
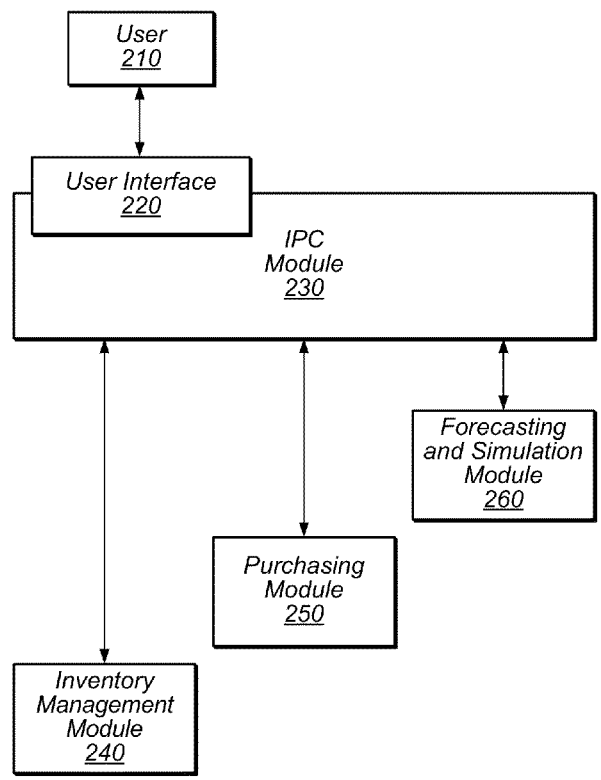
FIG. 2 is a block diagram illustrating an inventory planning and control software module according to some embodiments.

Turning to FIG. 2, a block diagram of an inventory planning and control (IPC) software module is depicted according to some embodiments. Generally speaking, IPC module 230 may be configured to generate purchasing plans that, when executed, cause orders to be automatically sent to suppliers or vendors requesting that specified quantities of items be shipped to one or more of the merchant's fulfillment centers at predetermined times. As illustrated, module 230 is configured to provide user interface 220, which allows user 210 to interact with IPC module 230 and access some or all of its various features. In some implementations, user interface 220 may be a graphical user interface (GUI) or a web-based user interface (WUI) that implements Java™, AJAX, Adobe® Flex®, Microsoft® .NET, or similar technologies to enable real-time user control. Additionally or alternatively, user interface 220 may be a command line interface or the like. Examples of user interface 220 that may be presented during a user's interaction with IPC module 230 are described with respect to FIGS. 4-6.

In some cases, user 210 may be an instock or retail manager in charge of one or more of a merchant's products or an IPC product manager for the merchant, or other user. As such, user 210 may interact with IPC module 230 to create, develop and/or analyze one or more purchasing plans. For example, during a first portion of the calendar year, user 210 may wish to implement a just-in-time purchasing plan—or some other "lean" inventory technique—that reduces in-process inventory and associated carrying costs. Moreover, during another portion of the calendar year, user 210 may implement a different purchasing plan that better fits his or her business goals while obeying certain operational constraints and/or seeking to account for one or more supply chain risks. For example, during a merchant's seasonal sales period, it may be advantageous to depart from the just-in-time approach and stock additional inventories of certain items. As such, user 210 may operate IPC module 230 to create any number of purchasing plans for these various items.

In some embodiments, IPC module 230 may be configured to receive from user 210 one or more business goals to be achieved during a particular time period, as well as one or more operational constraints and one or more supply chain risks corresponding to that period. IPC module 230 may then evaluate a financial cost model to provide a purchasing plan for the item based on the business goals and/or operational constraints and/or risks. Models that are suitable for implementation by IPC module 230 are described in more detail below. In some embodiments, in evaluating the financial cost model, IPC module 230 may also receive information from inventory management module 240, purchasing module 250, and/or forecasting and simulation module 260.

In certain embodiments, IPC module 230 may utilize a set of rules or specifications (e.g., Application Programming Interface (APIs)) that access or make use of the services and resources provided by inventory management module 240, purchasing module 250, and/or forecasting and simulation module 260. Generally speaking, some or all of modules or elements 230-260 may be bi-directionally interconnected such that each such module is configured to send and receive messages from other modules. As shown in this particular embodiment, IPC module 230 may communicate with each of inventory management system 240, purchasing module 250, and/or forecasting and simulation module 260. In addition, one or more of these various elements may have its own user interface (not shown) to allow independent user access.

In some embodiments, inventory management module 240 may be a software application residing within inventory management system 150 shown in FIG. 1. As such, inventory management module 240 may include an inventory database corresponding to items 135 stored in storage area 130. Such a database may generally be configured to store any kind of data related to items 135. For example, the database may store records that relate an identifier for a particular item 135 (e.g., a vendor or merchant's stock keeping unit (SKU) identifier) with an identifier that may be specific to fulfillment center 100. The database may also include information regarding the quantity of each item presently in stock, for example. Moreover, for one or more of items 135, an inventory database may contain an associated expiration date, expiration time, shelf life, or the like.

In various embodiments, the inventory database may include any suitable type of application or data structure that may be configured as a persistent data repository. For example, the database may be configured as a relational database that includes one or more tables of columns and rows and that may be searched or queried according to a query language, such as a version of Structured Query Language (SQL). Alternatively, the database may be configured as a structured data store that includes data records formatted according to a markup language, such as a version of eXtensible Markup Language (XML). In other embodiments, a database may be implemented using one or more arbitrarily or minimally structured data files managed and accessible through any suitable type of application.

In addition to an inventory database, inventory management module 240 may also include information regarding certain operational constraints that are particular to fulfillment center 100. For example, inventory management module 240 may indicate inbound stream constraints (e.g., characteristics or limitations related to receiving area 120), storage constraints (e.g., maximum number of inventory units that can be stored in storage area 130), as well as other types of inventory constraints (e.g., inventory value, inventory cube, etc.).

Forecast and simulation module 260 may be configured to make certain predictions and simulations that may be useful in evaluating a financial cost model over a long period of time (e.g., 4, 6, 12 weeks, etc.) and/or multiple planning periods. For example, module 260 may be configured to determine a demand forecast for a particular item by estimating the quantity of the item that is likely to be sold within a specified planning horizon. In some cases, forecasting module 260 may employ quantitative methods and/or historical data to predict future demand for a given item. In addition to calculating a demand forecast, module 260 may determine a forecast magnitude risk (e.g., the risk that the forecast will be under- or over-biased) and/or a forecast timing risk (e.g., the risk that the timing of the actual demand will be different than the forecast). Module 260 may also be configured to determine a vendor lead time accuracy risk (e.g., the risk that vendors will take longer to ship and/or transport products to the merchant than what is predicted), a weather delay risk (e.g., the probability that weather concerns will affect inbound traffic and/or fulfillment center operations), allocated product supply risk (e.g., the risk of ongoing supply shortage that a merchant will not be able provide the item), and/or vendor supply risk (e.g., the risk of intermittent or short term supply shortage or probability that a given item will become unavailable from a vendor for some period of time). A technique for detecting supply risk is described later in this document. Other risks may also be taken into account in generating a purchasing plan, such as other transportation risks, internal backlog risks, etc. In some embodiments, one or more of these variables may be used by IPC module 230 in evaluating a financial cost model or the like to determine a purchasing plan.

Purchasing module 250 may be configured to implement a purchasing plan devised by IPC Module 230 and/or selected by user 210. To that end, purchasing module 250 may include a database of purchasing channels, vendor, costs, etc. In operation, module 250 may receive an indication from IPC module 230 as to a quantity of a particular item to be repurchased and/or the timing of such repurchasing. Purchasing module 250 may then communicate directly with vendors, suppliers and/or carriers to execute purchasing plans.

Each of modules or elements 230-260 may dynamically process information that changes over time. For example, a new disposition channel may become available for a given item 135, or an existing disposition channel may no longer be available for that same item. Also, a disposition value of an item may decrease or increase over time.

Similarly, new and existing purchasing channels, as well as corresponding re-buy costs, may be subject to change. Demand forecast may also be a function of the planning horizon and/or may vary at any given time. Further, the contents of the inventory database may change when units of new or existing items are shipped to or from fulfillment center 100. Therefore, in some embodiments, the information provided to and/or generated by each of modules 230-260 may be continuously or periodically updated to reflect changes in disposition, repurchasing, forecast, and/or inventory conditions. In some cases, such updates may be automatically performed. In other cases, some or all of these updates may be implemented by user 210.

In some embodiments, one or more of IPC module 230, inventory management module 240, purchasing module 250, and forecasting and simulation module 260 may be part of inventory management system 150, although these modules need not reside within fulfillment center 100. Moreover, when an enterprise operates two or more fulfillment centers or warehouses, elements 230-260 may be common to some (or all) such fulfillment centers. In some embodiments, elements 230-260 may reside in a number of different computing systems distributed throughout an enterprise. For example, certain financial data may be stored in an accounting database associated with an accounting department that may be distinct from elements 230-260.

In various embodiments, the modules shown in FIG. 2 may represent sets of software routines, logic functions, and/or data structures that are configured to perform specified operations. Although these modules are shown as distinct logical blocks, in other embodiments at least some of the functionality provided by these modules may be combined in to fewer blocks. Conversely, any given one of modules 230-260 may be implemented such that its functionality is divided among a two or more logical blocks. Moreover, although shown with a particular configuration, in other embodiments these various modules may be rearranged in other suitable ways.

Figure 3:
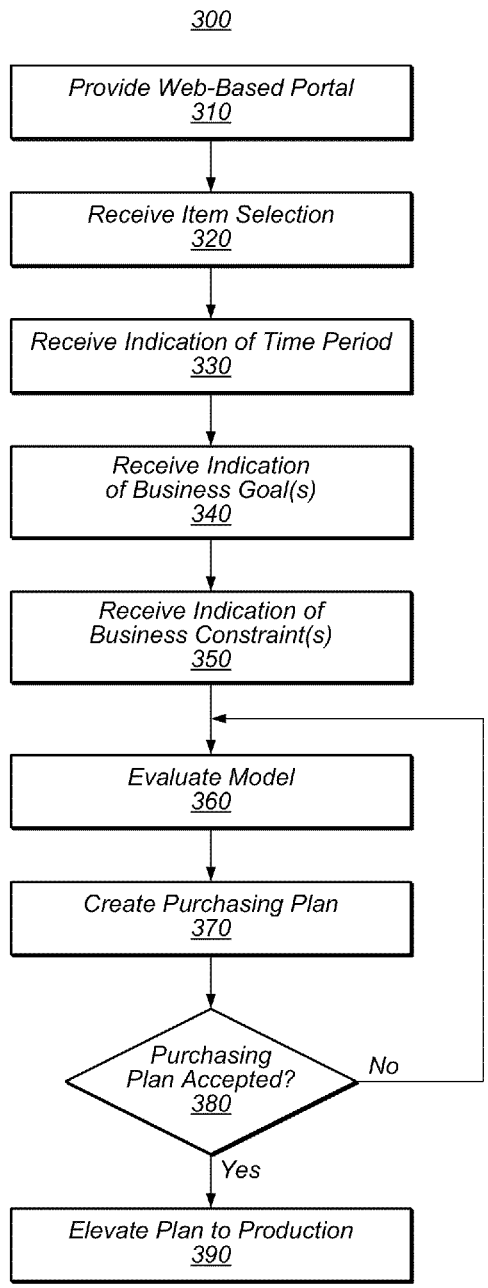
FIG. 3 is a flowchart of a method for inventory planning and control according to some embodiments.

Turning now to FIG. 3, a flowchart of a method for inventory planning and control is depicted according to some embodiments. In some embodiments, method 300 may be performed by IPC module 230. At block 310, IPC module 230 may provide user 210 with a planning portal through user interface 220. For example, the planning portal may be a web-based portal or any other type of interface. In some cases, IPC module 230 may allow user 210 to sign-in to use the planning system. Once the user's credentials have been verified against a database, IPC module 230 may allow user 210 to perform a series of actions to devise a purchasing plan for a given item or set of items.

At block 320, IPC module 230 may receive an item selection. In some cases, the selected item may be one or more of items 135 shown in FIG. 1. In other cases, the item may be of a type that is not currently stored in fulfillment center 100. To help the user identify the item, the planning portal may present user 210 with a drop-down list of items. Additionally or alternatively, the planning portal may allow the user to search of an item by name, brand, manufacturer, Universal Product Code (UPC), product description, etc. The planning portal may also allow user 210 to manual enter a new item in the system. In some embodiments, items may be classified according to one or more hierarchical groups such that one or more categories may include one or more sub-categories. For example, a "Sports & Outdoors" category may include a "Team Sports" sub-category among many others. The "Team Sports" sub-category may in turn include its own categories (e.g., football, soccer, baseball, etc.), under which individual items may be found (e.g., a helmet). Accordingly, in some cases, IPC module 230 may allow a user to select an individual item or a set of items corresponding to a hierarchical item category. Furthermore, when evaluating a model in block 360, IPC module 230 may allow user 210 to aggregate the selected item with at least one other item similarly classified under the multi-level hierarchy. For example, in some embodiments IPC module 230 may allow user 210 to "roll-up" an item hierarchy to any suitable level, and may perform simulations for entire category of items.

For example, in some embodiments, user interface 220 may provide a simulation group hierarchy view that provides an expandable visual representation of the available tree of simulation groups for various groups of items. These simulation groups may be rolled up to be viewed in aggregated form, and may also shows the level at which simulation inputs are adjusted (i.e., "leaf nodes"). These views may also allow the user to click on a simulation group to access either the simulation group or aggregated groups views described below. Further, other views may show deep levels of aggregation that a user may have access to through the planning portal. As with aggregated simulation group views, a user may be able to review the various output dimensions for a given simulation group as a time series.

At block 330, IPC module 230 may receive an indication of a time period to which the purchasing plan is intended to apply. For instance, a merchant may be currently implementing just-in-time techniques to minimize an amount of inventory on-hand during a period where fulfillment-related variables are in relative steady-state. When user 210 operates IPC module 230, the user may desire to address a different time period (e.g., a "peak" or "seasonal" time period) that is expected to introduce stress conditions in the merchant's fulfillment systems: In some embodiments, the time indication or selection made at block 330 may cover one or more subsequent planning periods for the item, and the financial cost model evaluated in block 360 may be configured to account for one or more subsequent re-orders corresponding to the one or more subsequent planning periods. For example, IPC module 230 may determine that a selected item is under a particular ordering cycle, that the simulation date is off that cycle, and may consider planned orders that will take place in the future when devising a purchasing plan.

At block 340, IPC module 230 may receive an indication of one or more business goals from user 210. An example of a business goal includes an instock probability (i.e., a probability that an item will not run out of stock during a particular planning period). Another example of a business goal includes an inventory value (i.e., a dollar amount that is desired to be held in inventory). Another example of a business goal includes a required return on inventory investment. However, any other suitable business goals may be used. In some embodiments, the selected business goal(s) may be different from a goal currently being pursued through an existing purchasing or re-ordering plan. Moreover, a business goal may vary over time (e.g., user 210 would like to have 90% instock the week prior to "Black Friday" and 98% instock during that week).

IPC module 230 may, at block 350, receive an indication of one or more operational constraints (or other type of fulfillment-related constraints) and one or more risks. In some embodiments, these operational constraints and risks may be provided to IPC module 230 by user 210. In other embodiments, however, IPC module 230 may obtain one or more constraints and risks from other modules (e.g., modules 240-260 in FIG. 2) and/or may determine the constraint(s) or risks on its own. Examples of operational constraints include an inbound inventory constraint and an inventory holding constraint. Constraints may be input or determined as a specific quantity, such as a maximum inventory capacity constraint. Examples of risks include a weather delay risk, a demand forecast risk, a vendor lead time risk, or an allocated product supply risk. Another example includes a risk that a supplier will stock out of the item during the seasonal period. The latter example is discussed in more detail below and illustrates a situation in which IPC module 230 may automatically calculate a risk. Risks may be input or determined as a probability.

At block 360, IPC module 230 may evaluate a multiple constraint optimization or financial cost model that takes into account one or more of the received business goals and operational constraints and risks. Additionally or alternatively, IPC module 230 may request that forecasting and simulation module 260 perform at least a portion of the model's evaluation. Using the output of the model, at block 370 IPC module 230 may create a purchasing plan for the selected item for the specified time period (e.g., a "seasonal purchasing plan" corresponding to a "seasonal purchasing period"). For example, the output of the model may be formatted into a series of one or more commands that may be interpreted and implemented by purchasing module 250. In alternative embodiments the output of the model may already be a native format that is suitable for processing by purchasing module 250.

In some cases, given the specified business goals, it may not be possible for block 360 to find a satisfactory solution without violating one or more operational constraints (and vice-versa). In those cases, IPC 230 may alert the user and/or it may apply a tradeoff between two or more of the operational constraints and/or business goals at block 360. For sake of illustration, consider a hypothetical scenario where user 210 indicates, as an inbound unit constraint, that a fulfillment center can only receive a certain number of units of a particular item per week. In this scenario, it may not be possible to satisfy the inbound unit constraint without violating another competing constraint or business goal (e.g., inventory value or instock probability). When two or more constraints conflict, to evaluate the model IPC 230 may apply rules or heuristics to chose which constraint(s) are satisfied and which constraint(s) are violated to yield a purchasing plan that, although may not satisfy all the operation constraints or goals, may nonetheless provide results that are acceptable to user 210. The plan or other output may indicate to the user what tradeoffs were made between conflicting constraints. The output may indicate which constraints were violated and by how much. In other embodiments, alternative plans may also be generated based on different tradeoffs between conflicting constraints so that a user may see how the purchasing plan differs based on the tradeoffs.

Additionally or alternatively, in some situations, IPC module 230 may generate and present alerts to user 210 even when a selected business goal or constraint is not violated or specified. For example, if user 210 does not provide IPC module 230 with an indication of how much money can be used with a particular purchasing plan (or affirmatively indicates that budget is not a concern), IPC module 230 may nonetheless alert the user if the calculated purchasing plan would require a budget above a preset threshold. In other cases, if a purchasing plan would cause a given constraint to exceed a particular rate of change (e.g., inbound capacity would have to be five times the previously or presently used capacity), IPC module 230 may also alert the user—again, even if the constraint is not specified by user 210 at block 350.

The devised purchasing plan may be displayed to user 210 via the planning portal at block 380. User 210 may analyze the purchasing plan using one or more tools that enable reconfiguration of the selected item, time period, business goals, risks, and/or operational constraints to simulate alternative inventory and/or purchasing scenarios. If user 210 chooses to alter or fine tune one or more of these variables, control returns to block 360 and the model may be re-evaluated. Once the user accepts a given purchasing plan, at block 390 IPC module 230 may elevate the accepted plan to production. For example, IPC module 230 may transmit the purchasing plan, along with its associated commands or instructions, to purchasing module 250.

Figure 5:
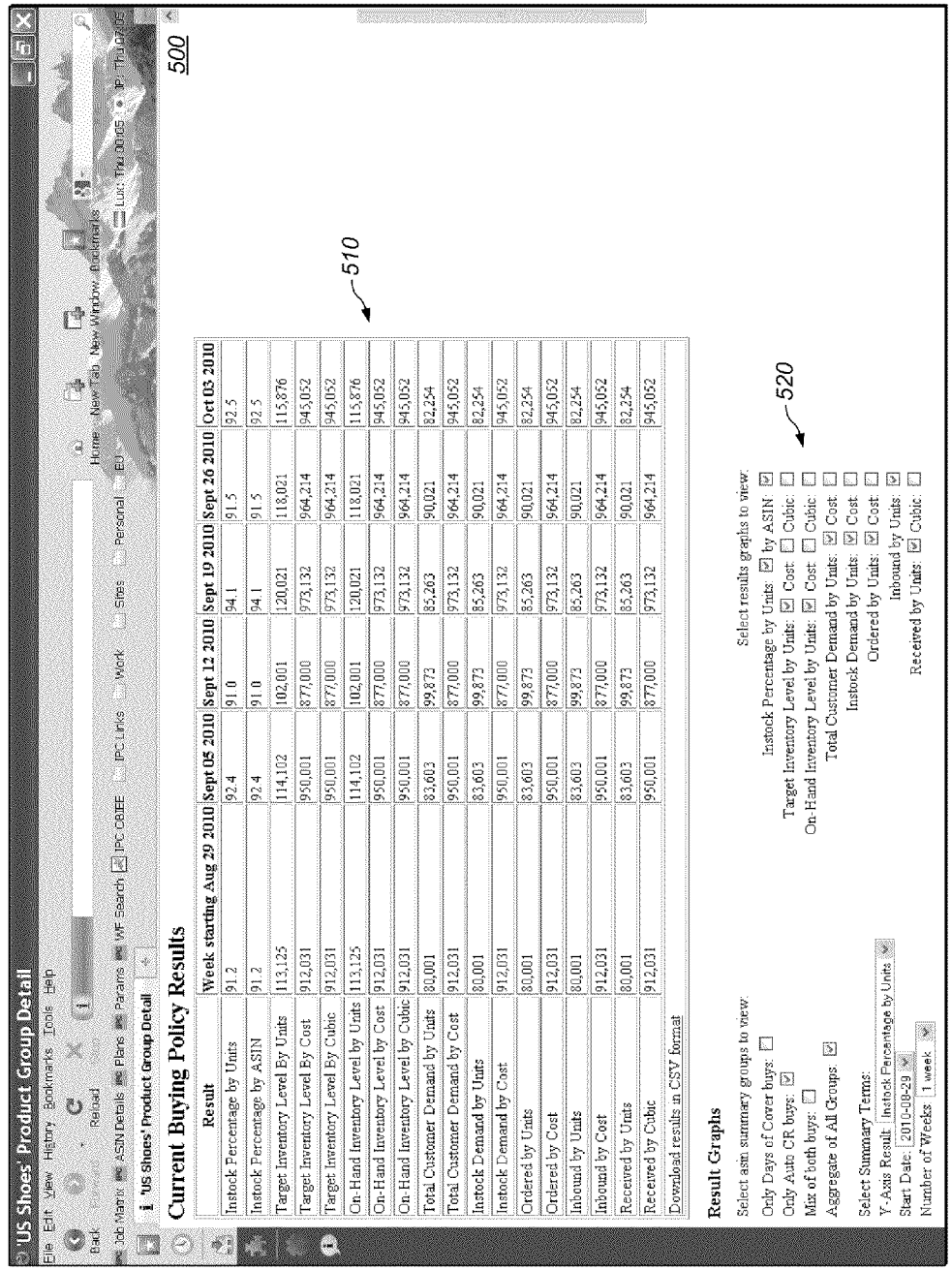
Figure 6:
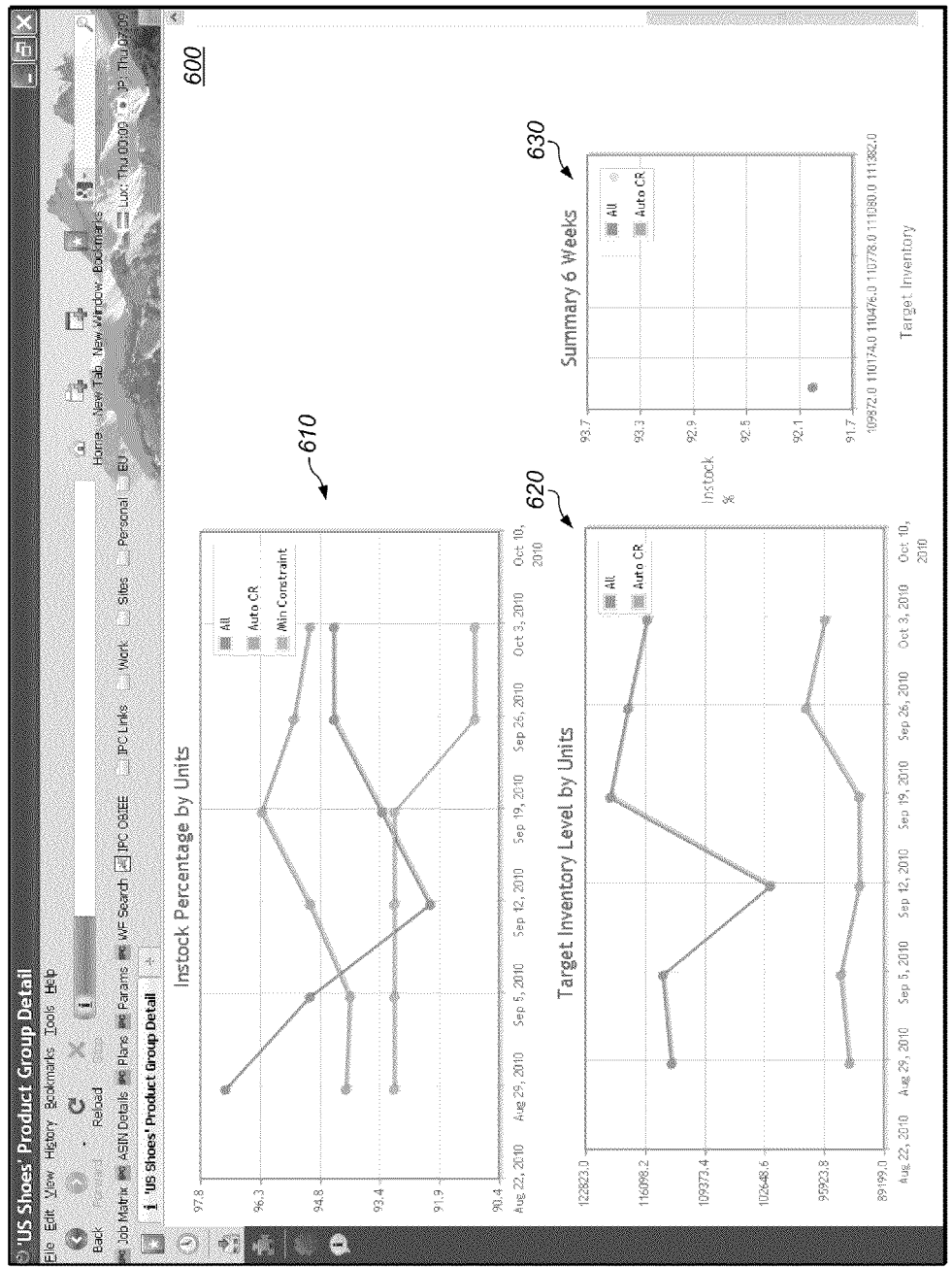

Referring to FIGS. 4-6, screenshots of a user interface of an inventory planning and control software module according to some embodiments. In some cases, screenshots 400-1800 may be presented via user interface 220 shown in FIG. 2. As illustrated, FIG. 4 shows a product group detail ("US Shoes"), with business goals 410 and operational constraints 420 provided by a user. In this example, the business goals 410 include an instock percentage for two distinct time periods, whereas the operational constraints 420 include amounts of sortable and non-sortable on-hand capacity. Table 430 shows analysis requests (completed and in progress) that have been previously submitted by the user (or other users). As illustrated, table 430 may include controls that allow the user to view these previous analysis requests and submit new requests. In FIG. 5, screenshot 500 shows elements of a purchasing plan 510 determined by evaluating a model that takes the provided business goals, operational constraints and/or risks into account. Control elements 520 may allow the user to plot these results in the form of one or more graphs, as shown in FIG. 6. Specifically, screenshot 600 shows graph 610 of instock percentage by units, graph 620 of target inventory level by units, and summary graph 630 of instock levels by amount of target inventory.

Figure 8:
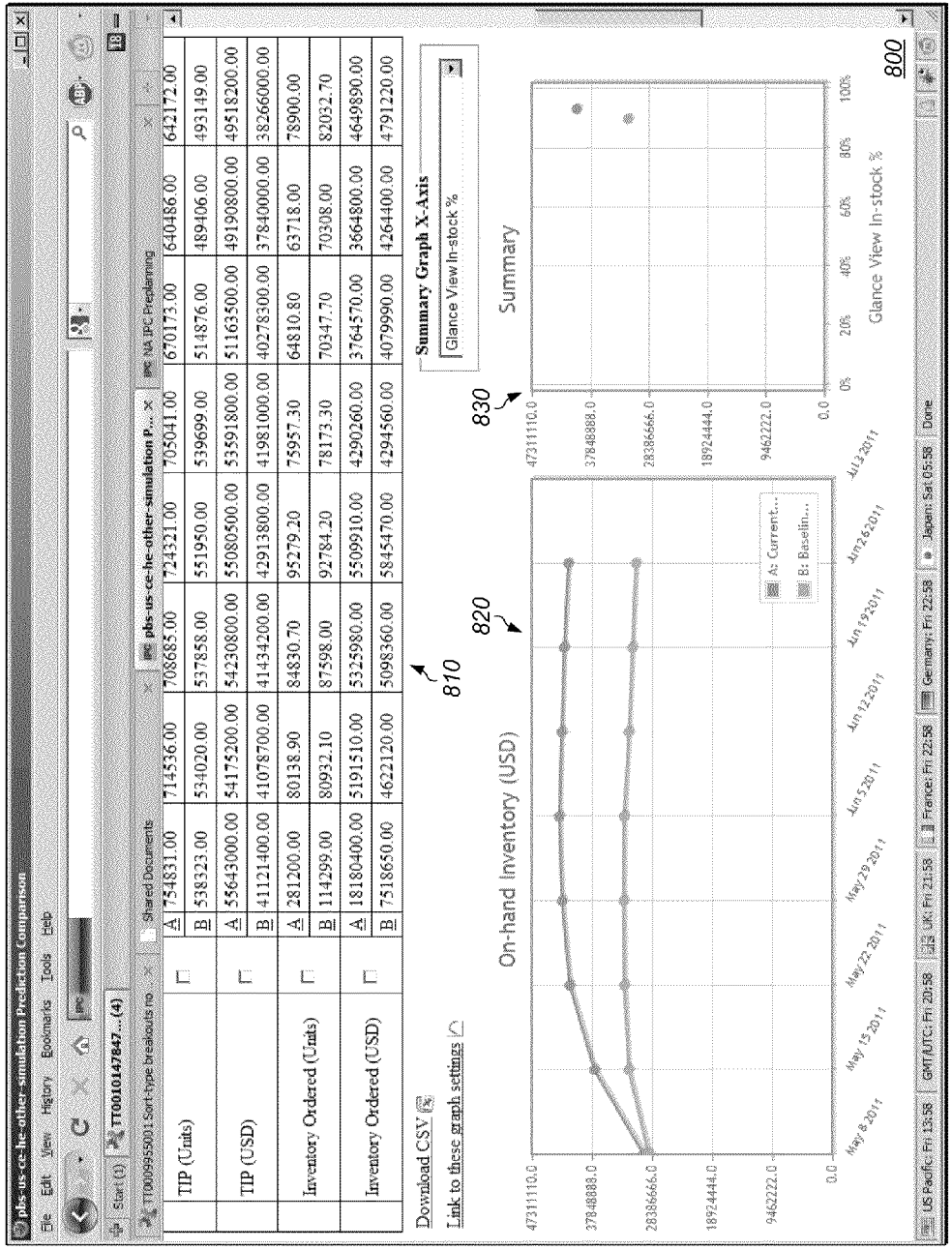
Figure 9:
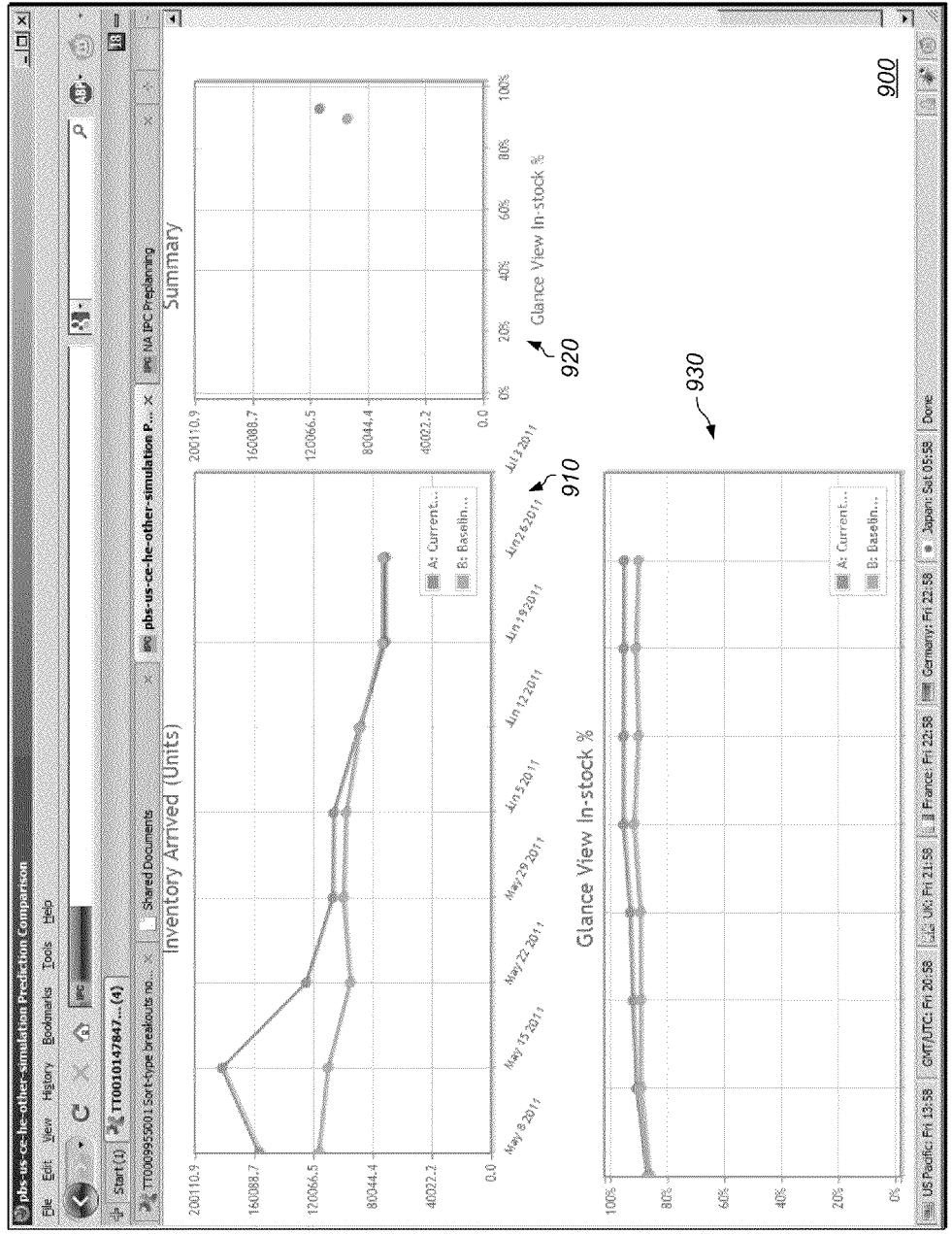
Figure 10:
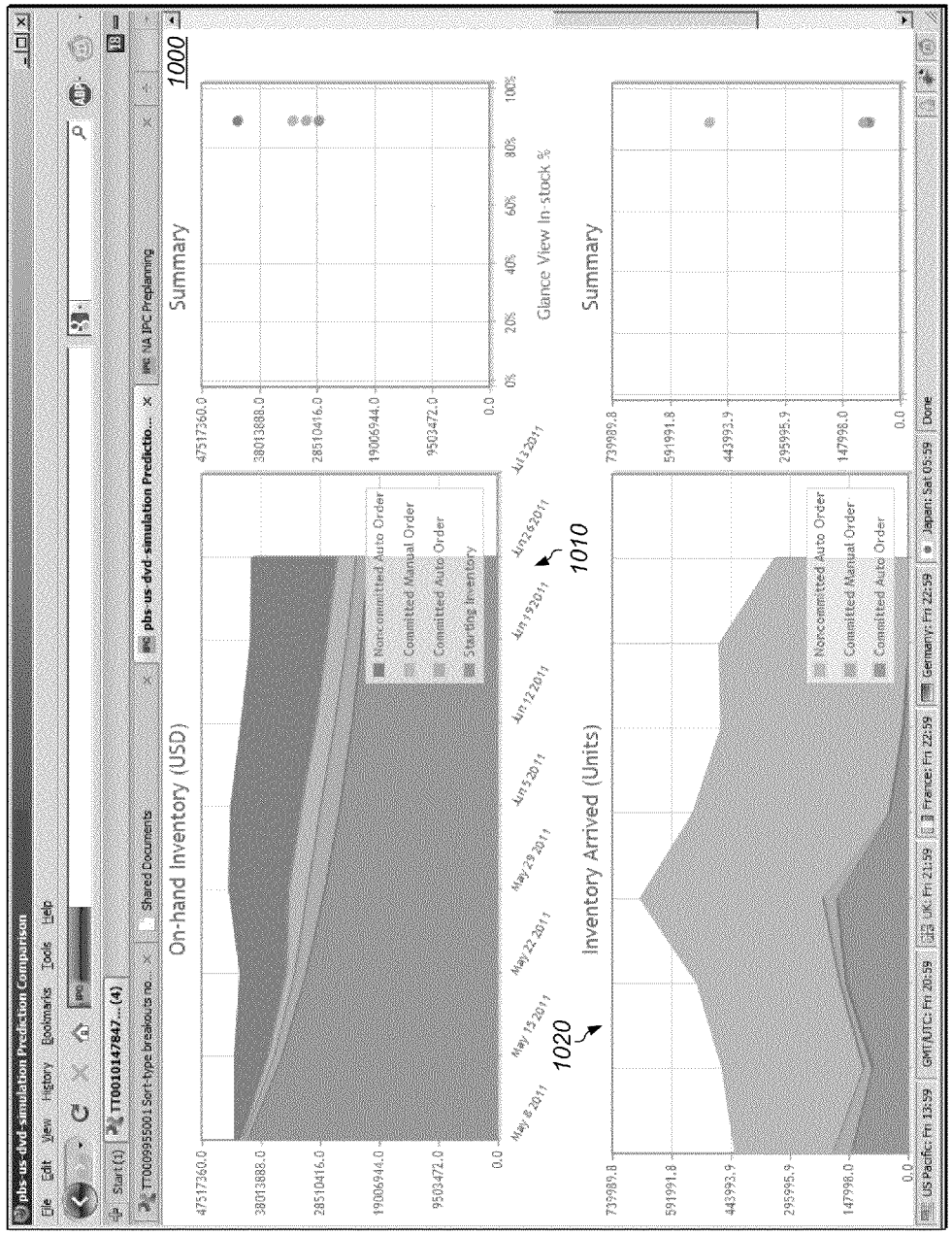

FIGS. 7-10 illustrate examples of buying policy and prediction pages that may also be provided via user interface 220 according to some embodiments. Particularly, screenshot 700 in FIG. 7 shows buying policies and capacity constraint tables 710 on the upper portion of the page, as well as predictions tables 720 on the lower portion of the page. Screenshot 800 in FIG. 8 shows additional predictions 810 that may be downloadable as comma-separated values (CSV) file. Graph 820 shows an amount of on-hand inventory (U.S. dollars) across each selected simulation result, whereas graph 830 shows a summary of a selected statistic (e.g., the ratio of instocks to inventory). Screenshot 900 in FIG. 9 shows additional simulation graphs. Particularly, graph 910 shows units of inventory arrived for each simulation point, graph 920 shows a summary similar to graph 820 in FIG. 8, and graph 930 shows a percentage of glance views (e.g., customer page views of the item on a website) for items in-stock across future simulations. Screenshot 1000 in FIG. 10 shows an alternative display of inventory drain for the case where only one simulation run is selected. This particular embodiment allows a user to determine, for example, how long it will be before inventory of the various types (e.g., automatically purchased vs. manually purchased, committed (purchased) vs. uncommitted (not yet purchased)) drains out both in terms of on-hand inventory in graph 1010 and in terms of units of inventory arrived in graph 1020.

Figure 13:
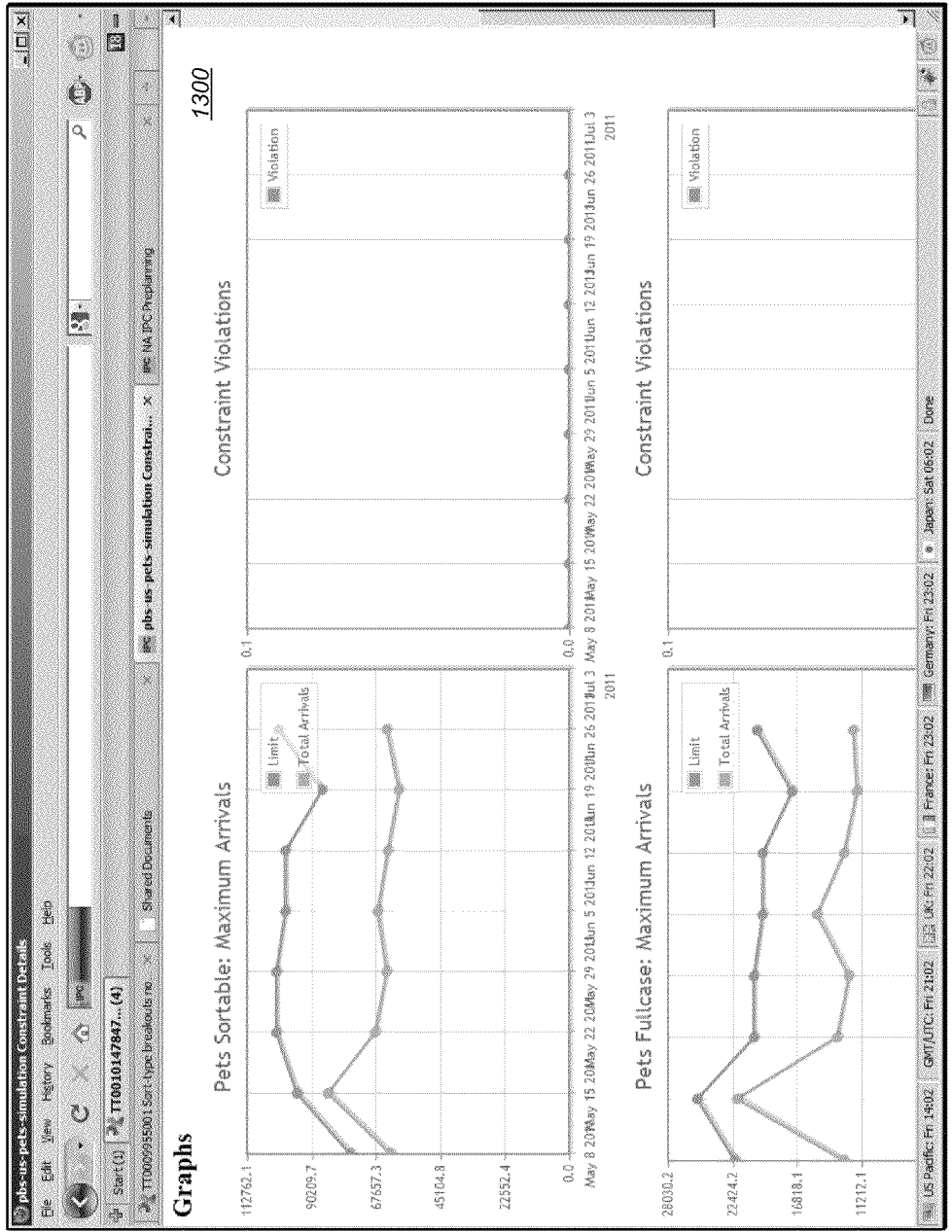
Figure 14:
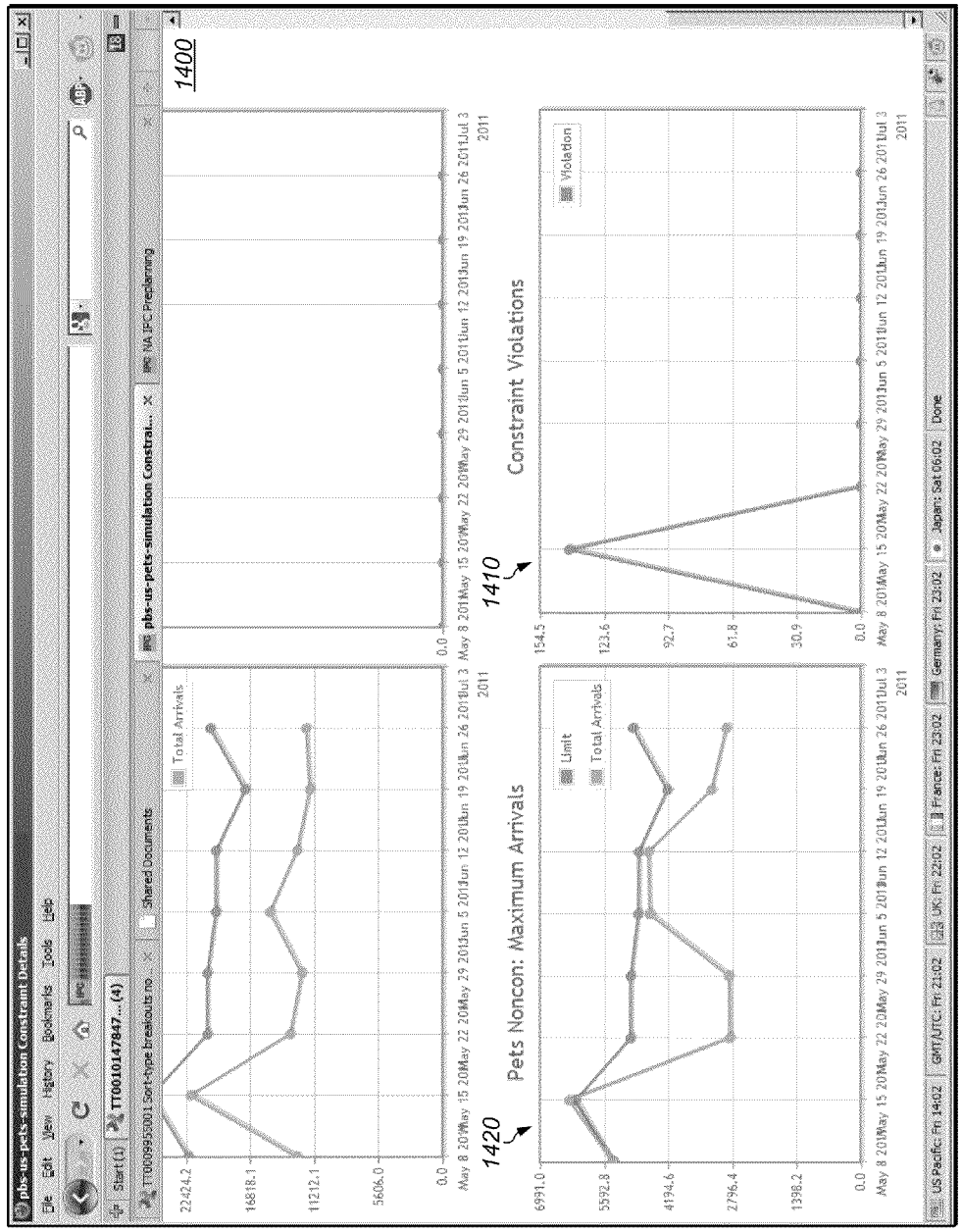

FIGS. 11-15 illustrate examples of capacity control pages that may also be provided via user interface 220 according to some embodiments. Specifically, in FIG. 11 screenshot 1100 is similar to screenshot 700 of FIG. 7, but for a set of products that is additionally constrained by maximum arrival capacity (e.g., at a fulfillment center's receiving dock, or the like). Screenshot 1200 in FIG. 12 shows three tables illustrating resulting capacity predictions versus allocated capacity, screenshot 1300 in FIG. 13 shows simulation graphs corresponding to the first two tables depicted in FIG. 12 ("Pets Sortable" and "Pets Fullcase"), and screenshot 1400 in FIG. 14 shows a simulation graph illustrating the third table of FIG. 12 ("Pets Noncon"). With respect to screenshot 1400, it may be noted that this particular simulation has resulted in a capacity violation on the second week of the simulation, as shown by "Constraint Violation" graph 1410, as well as by a crossover between "Limit" and "Total Arrival" curves on graph 1420. Screenshot 1500 displays capacity limits or constraints for an "Automotive" group of products, with a constraints override option available to a user.

Figure 17:
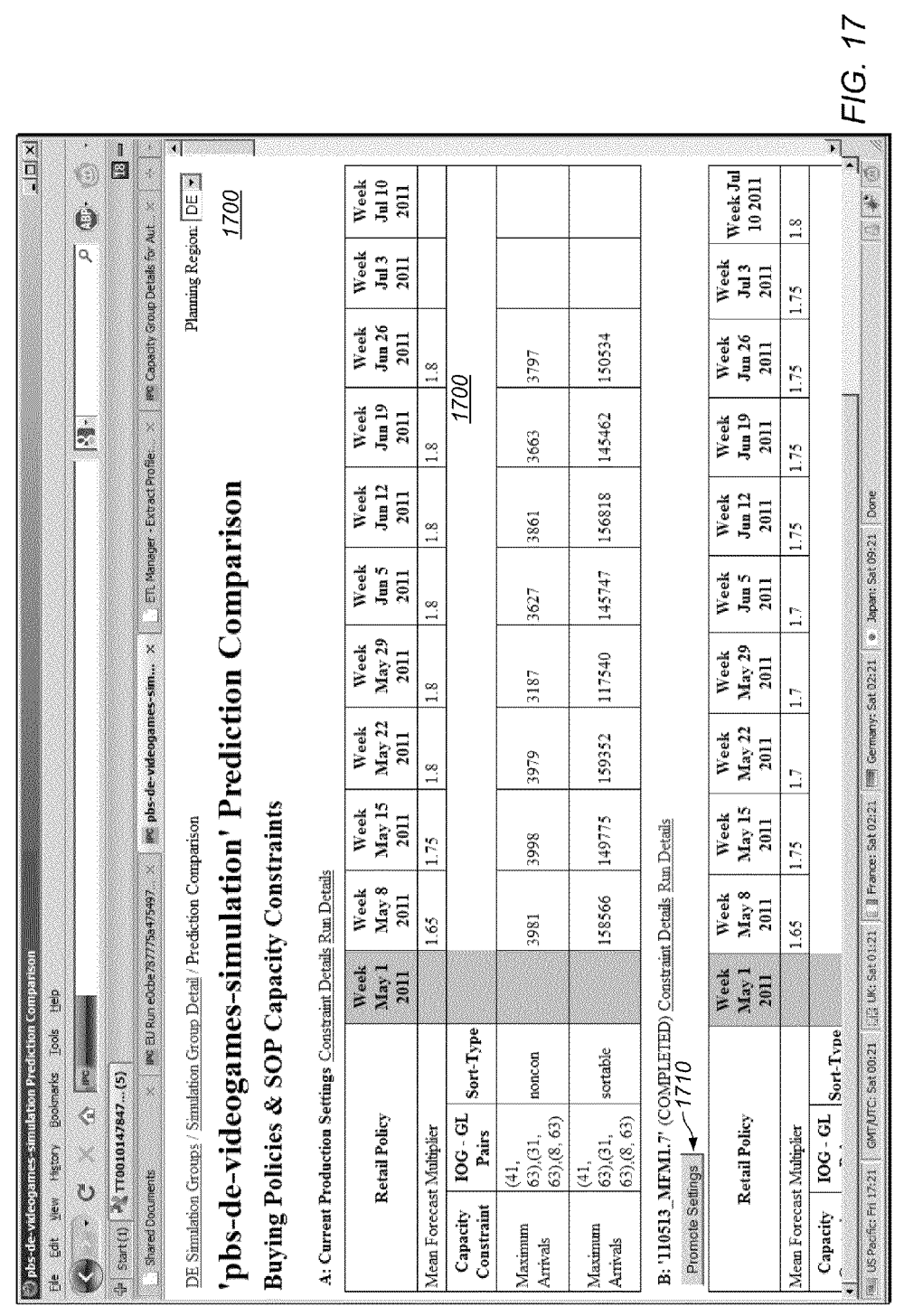
Figure 18:
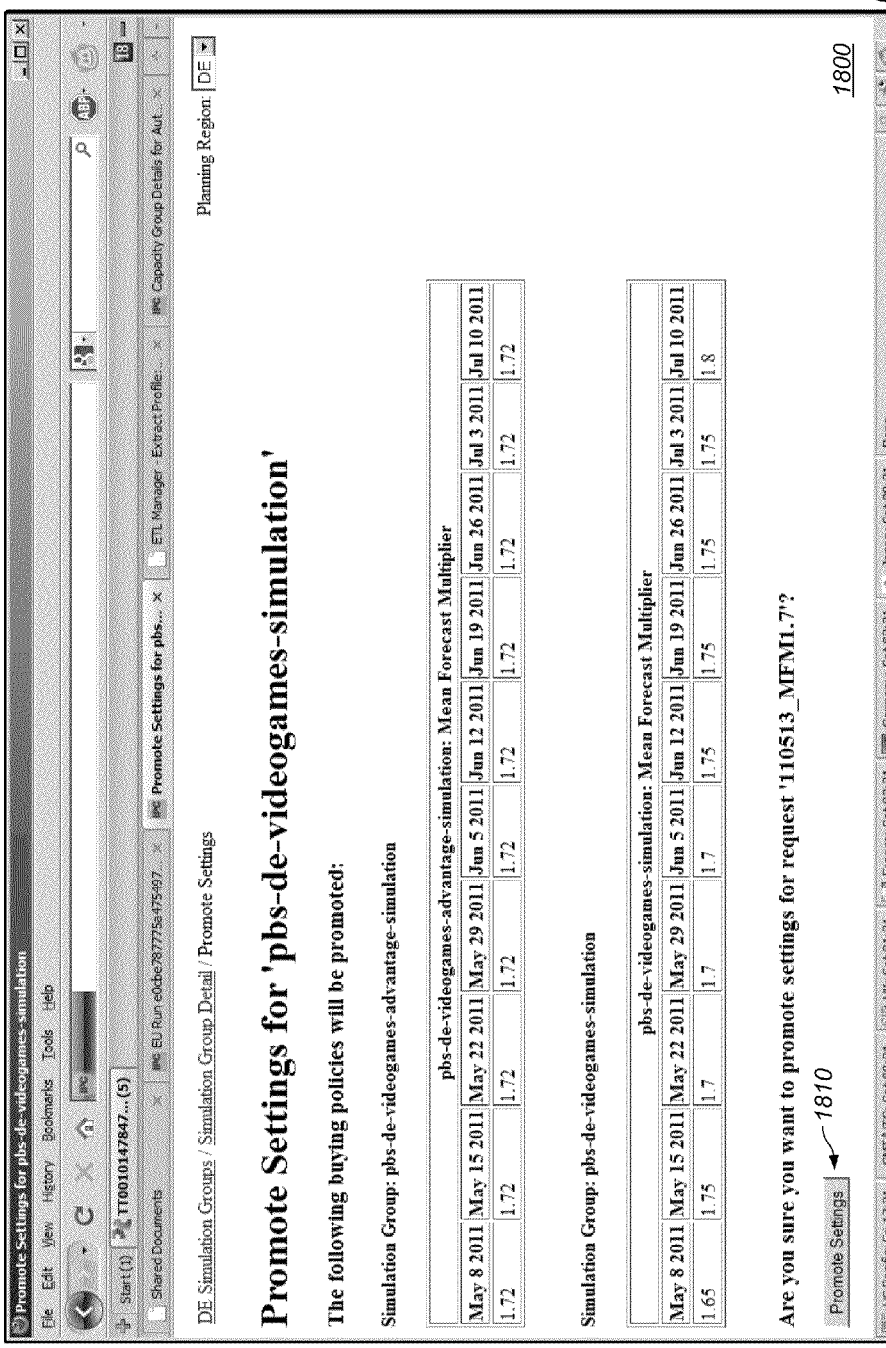

FIG. 16 illustrates an example of a control page for starting a new simulation according to some embodiments. Particularly; screenshot 1600 shows a new analysis request for a given group of products. The new simulation may receive inputs such as, for example, mean forecast multipliers, capacity group constraints or limits, etc. FIGS. 17 and 18 illustrate examples of simulations that may be elevated to production according to some embodiments. For instance, in FIG. 17 screenshot 1700 includes "Promote Settings" button 1710. Screenshot 1800 in FIG. 18 illustrates a confirmation page that may be presented after a user presses button 1710 and prior to actually elevating the simulated buying policies to production, for example, in response to the user further pressing button 1810.

It should be noted that the screenshots of FIGS. 4-18 are depicted only by means of illustration, and it is understood that numerous variations are contemplated. For example, in some embodiments a planning portal may allow the user to select an comparative view (e.g., side-by-side) that combines the results of multiple simulation outputs over a user defined period of time and displays them as a one-dimensional output.
Supply Risk Early-Detection Techniques When a vendor or supplier goes out of stock ("stocks out") of an item that has otherwise been generally available for purchasing by a merchant, the merchant is likely to go out of stock of that item soon thereafter—particularly if the merchant has implemented just-in-time or other lean purchasing techniques. Moreover, although seasonal sales periods can bring increased sales volume, the variability of customers' demand, vendor supply constraints, fulfillment center constraints, and increased risk of customer dissatisfaction also increases. Hence, to avoid running out of stock of a particular item during the seasonal period, the merchant may use arbitrary "extension strategies" to its various purchasing plans. Such strategies usually involve artificially causing a purchasing system to buy more quantities to be stocked in inventory. Ultimately, however, these extension strategies may also often cause either: (a) unnecessary inventory build for items that did not actually need to carry extra supply, or (b) insufficient stockup for items that did actually have vendor supply risk issues because of unnecessary investment in other items that did not actually require additional stock.

To address these and other supply-related concerns, IPC module 230 may determine a risk that a vendor will "stockout" of an item (or otherwise be subject to a supply constraint) during a seasonal purchasing period as well as an expected length of the stockout. In some cases, these supply risk and timing constraints may be automatically identified by IPC module 230 and used as operational constraints in developing a purchasing plan without requiring user input. In other cases, the techniques described below may be implemented by a separate software module configured to determine supply risks. Moreover, in the examples described herein, a "supply constraint" or "stockout" event includes events that lead to any of a merchant's purchase order rejection, a merchant's purchase order cancellation, a merchant's purchase order backorder, or a merchant's partial receipt or ordered items. In other implementations, however, a subset of these events (other supply constraints of concern to the merchant) may be used. For instance, in some cases, the merchant may only be interested in order rejections. In other cases, the supply constraint of interest may include only backorders.

In some embodiments, a method for detecting supply risk may calculate a probability that a supplier will run out of stock of a particular item based on the current state of a selected number of fulfillment-related features. For example, the method may analyze historical data that includes stockout events, as well as the state of a large set of fulfillment-related features. Based on the historical data, the method may determine which of the fulfillment-related features are correlated with corresponding stockout events. Once the correlated fulfillment-related features are identified, the method may build a supply risk model that takes the present state of the correlated fulfillment-related features into account in determining the likelihood that another stockout event will happen, the timing of the stockout, and its expected duration. For example, the supply risk model may include a logistic regression function that uses a linear combination of the various fulfillment-related features with respective coefficients as an exponent of the function. An example of such a supply risk model is described in more detail below. However, other types of statistical models may be used for the supply risk early detection model in other embodiments.

Figure 19:
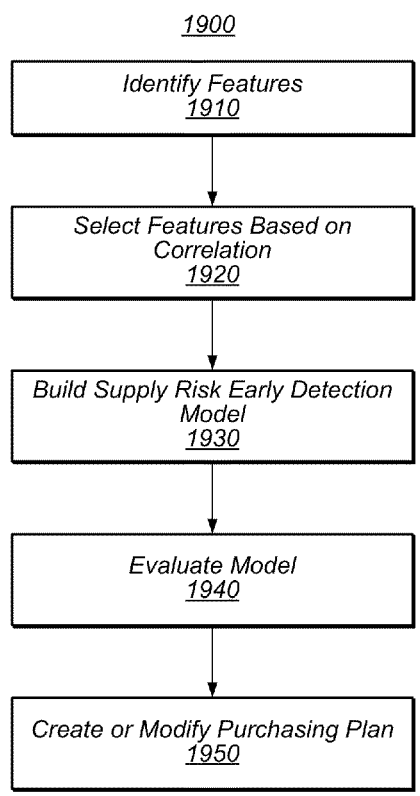
FIG. 19 is a flowchart of a method for estimating supply risk early detection according to some embodiments.

Turning now to FIG. 19, a method for estimating supply risk early detection is depicted according to some embodiments. At block 1910, method 1900 may identify fulfillment-related features corresponding to an item to be stored in inventory, where the item is supplied by a third-party vendor. At block 1920, method 1900 may select a subset of the fulfillment-related features that is correlated with a supply constraint associated with the item. At block 1930, method 1900 may build a supply risk early detection model based, at least in part, upon the subset of fulfillment-related features. At block 1940, method 1900 may evaluate the supply risk early detection model to determine a probability that the third-party vendor will suffer a shortage of the item, as well as an expected duration of the shortage. At block 1950, method 1900 may create a purchasing plan (or modify an existing purchasing plan) that takes the probability and expected duration of the shortage into consideration. A higher supply risk may lead to a higher target inventory level. However, method 1900 may also evaluate the potential cost of being overstocked which could be introduced by buying for a longer period of time than what a typical just-in-time inventory strategy would dictate. Thus, the purchasing plan may also take into account an associated cost of buying additional units of the item and an associated cost of not having sufficient supply of the item to serve an expected demand for the item. The purchasing plan is created to determine an appropriate buying action to take in order to balance the risk detected from evaluating the supply risk early detection model with the associated costs. Creating the purchasing plan may involve determining how much more of an item to buy given the risk determined by evaluating the supply risk early detection model. How much more to buy to account for the risk may be dependent on the cost of buying additional units of the item compared to the cost of not having sufficient supply of the item to serve an expected demand for the item.

Examples of fulfillment-related features that may be used in the supply risk model may include a vendor identity, an item identity, a release date of the item (e.g., the date when the item was originally released or produced), a quantity of the item to be purchased (e.g., larger orders are typically more subject to supply constraints), a velocity with which the merchant sells the item to its customers, a user-defined replenishment code (explained in more detail in the experiment that follows), prior supply constraints, etc. In some embodiments, a method may take a larger set of fulfillment-related features and separate it into a first subset of features that exhibits a correlation with supply constraints and a second subset of features that is unrelated to such supply constraints. In some cases, the two subsets may be analyzed to determine whether there is a statistically significant difference between them. Further, methodologies that may be used to determine whether a particular feature is correlated with supply constraints include, but are not limited to, mean and standard deviation, Welch-Satterthwaite's t-test, and phi correlation.

To illustrate an application of a supply risk early detection model, an experiment was conducted where nine fulfillment-related features were sampled. As shown in Table I below, seven of those nine fulfillment-related features (vendor identity, item identity, release date, quantity submitted, replenishment variable, velocity, and previous 1-4 weeks supply constraints) were deemed to be correlated to supply risks and thus were included in supply risk model. The remaining two fulfillment-related features (price drop and demand spike) were deemed to be uncorrelated and thus excluded from the model.

TABLE I

| Fulfillment-related feature | Methodology | Result |
| --- | --- | --- |
| Vendor | Mean and Standard Deviation | Correlated |
| Item Identifier | Mean and Standard Deviation | Correlated |
| Release Date or Age | Welch-Satterthwaite's t-test | Correlated |
| Quantity Submitted | Welch-Satterthwaite's t-test | Correlated |
| User-Defined Replenishment Code | Phi correlation | Correlated |
| Velocity | Phi correlation | Correlated |
| Price Drop | Phi correlation | Not correlated |
| Demand Spike | Phi correlation | Not correlated |
| Prior Supply Constraints | Phi correlation | Correlated |

Using the "correlated" fulfillment-related features described above, a supply risk early detection model was constructed using the following logistic regression:

$$f(z) = \frac{e^z}{e^z + 1} = \frac{1}{1 + e^{-z}} \qquad \text{Equation(1)}$$

In Equation (1), the dependent variable f(z) is the level or probability of supply risk. The independent variables that define z include the fulfillment-related features for a particular item. Further, each feature may include one or more variables, and each variable may have its own coefficient defined as shown in Table II below:

TABLE II

| Variable | Description | Type | Coef. |
| --- | --- | --- | --- |
| V0.5 | Vendor whose "rate of constraint" is lower than 0.5 std above sample mean | categorical | (0.40) |
| V1 | Vendor whose "rate of constraint" is between 0.5 std and 1 std above sample mean | categorical | 0.23 |
| V2 | Vendor whose "rate of constraint" is higher than 1 std above sample mean | categorical | 0.54 |
| V0.5p | During peak period vendor whose "rate of constraint" is lower than 0.5 std above sample mean | categorical | (0.33) |
| V1p | During peak period vendor whose "rate of constraint" is between 0.5 std and 1 std above sample mean | categorical | 0.28 |
| V2p | During peak period vendor whose "rate of constraint" is higher than 1 std above sample mean | categorical | 0.61 |
| A0.5 | Item whose "rate of constraint" is lower than 0.5 std above sample mean | categorical | (0.70) |
| A1 | Item whose "rate of constraint" is between 0.5 std and 1 std above sample mean | categorical | 0.36 |
| A2 | Item whose "rate of constraint" is higher than 1 std above sample mean | categorical | 0.75 |
| A0.5p | During peak period Item whose "rate of constraint" is lower than 0.5 std above sample mean | categorical | (0.53) |

TABLE II-continued

| Variable | Description | Type | Coef. |
|---|---|---|---|
| A1p | During peak period Item whose "rate of constraint" is between 0.5 std and 1 std above sample mean | categorical | 0.32 |
| A2p | During peak period Item whose "rate of constraint" is higher than 1 std above sample mean | categorical | 0.71 |
| AGE(M) | Item's age | numerical | (0.01) |
| Q | Quantities submitted to vendor | numerical | 0.00004 |
| PR | User-Defined replenishment code PR | categorical | (0.17) |
| BR | User-Defined replenishment code BR | categorical | 0.08 |
| NP | User-Defined replenishment code NP | categorical | 0.49 |
| NR | User-Defined replenishment code NR | categorical | (0.05) |
| NS | User-Defined replenishment code NS | categorical | 0.42 |
| OB | User-Defined replenishment code OB | categorical | 0.16 |
| BANDA | Velocity band A | categorical | 0.21 |
| BANDB | Velocity band B | categorical | (0.02) |
| BANDC | Velocity band C | categorical | 0.01 |
| BANDD | Velocity band D | categorical | (0.02) |
| BANDE | Velocity band E | categorical | 0.001 |
| BANDF | Velocity band F | categorical | 0.71 |
| CONS1 | Supply constraint happened one week ago | categorical | 0.68 |
| CONS2 | Supply constraint happened two weeks ago | categorical | 0.65 |
| CONS3 | Supply constraint happened three weeks ago | categorical | 0.61 |
| CONS4 | Supply constraint happened four weeks ago | categorical | 0.60 |

In Table II, variables V0.5, V1, V2, V0.5p, V1p, and V2p correspond to vendor identification fulfillment-related features, whereas A0.5, A1, A2, A0.5p, A1p, and A2p correspond to item identification fulfillment-related features. The AGE variable corresponds to an items' age or release date, Q corresponds to the quantity of the item submitted to the vendor, and the variables PR, BR, NP, NR, NS, and OB correspond to user-defined replenishment codes. In some embodiments, user-defined replenishment codes may include attributes that are specific to a particular item or product line, and may refer to the way in which the item or product line is purchased. For example, in some cases, "PR" may refer to items that can be replenished on a regular basis and "BR" may refer to items that are only purchased reactively according to actual customer demand (i.e., not based on a forecast). More generally, however, each user-defined replenishment code may represent custom variable used in the fulfillment process, so long as there is a correlation between the variable and supply risk.

Still referring to Table II, BANDA-F correspond to velocity bands, such that BANDA identifies the fastest selling products and BANDF identifies the slowest selling products. Here, it may be noted that the fastest and slowest selling products show strongest correlation with supply risk. Hence, in alternative embodiments, use of only BANDA and BANDF variables (to the exclusion of BANDB and BANDC) may generate further efficiencies. Lastly, variables CONS1-4 correspond to supply constraints that may have occurred in prior 1-4 weeks.

The term "rate of constraint" used to define variables vendor and item (the first 12 variables in the table) in Table II may be calculated as the number of orders with supply constraints divided by the total number of orders submitted. The terminology "categorical variable" is used to represent dummy variables that take the values 0 or 1 to indicate the absence or presence of some categorical effect. For example, V0.5=1 means that a vendor's rate of constraints is lower than 0.5 sample standard deviation above sample mean, whereas V0.5=0 means it is higher than 0.5 sample standard deviation above sample mean. By comparison, numerical variables represent actual numbers, for example AGE(M) takes the actual age of an item. A positive coefficient means the increasing of the variable is associated with increasing supply risk, a negative coefficient means the increasing of the variable is associated with decreasing supply risk, and a coefficient's absolute value represents the amount of supply risk change associated with unit change of the variable. Accordingly, the higher the impact of the factor, the higher the absolute value of the coefficient.

To illustrate calculation of the coefficients shown in Table II, consider variable V1 (i.e., means vendor whose "rate of constraint" is between 0.5 std and 1 std above sample mean). In this example, the mean "rate of constraint" for vendors that fell into the category of V1 was calculated as 51%, and the mean "rate of constraint" of vendors outside of V1 was calculated as 28%. The coefficient for variable V1 may thus be calculated as 51%−28%=0.23, which indicates V1 is positively associated with supply risk. Performing similar calculations for the remaining variables yields a supply risk early detection model that uses Equation (1) with z=−0.40*V0.5+ 0.23*V1+0.54*V2−0.33*V0.5p+0.28*V1p+0.61*V2p− 0.70*A0.5+0.36*A1+0.75*A2−0.53*A0.5p+0.32*A1+ 0.71*A2p−0.01*AGE(M)+0.00004*Q−0.17*PR+ 0.08*BR+0.49*NP−0.05*NR+0.42*NS+0.16*OB+ 0.21*BANDA−0.02*BANDB−0.01*BANDC− 0.02*BANDD+0.001*BANDE+0.71*BANDF+ 0.68*CONS1+0.65*CONS2+0.61*CONS3+0.60*CONS4.

Of the various fulfillment-related features that this experiment found to be correlated to supply risk, most of them show consistent testing results across various product lines and time periods. For instance, user-defined replenishment code PR is negatively correlated with supply risk, while OB is positively correlated. Meanwhile, velocity bands A, E and F are positively correlated with supply risk, while velocity band D is negatively correlated. In other embodiments, however, different fulfillment-related feature may be examined for different lines of products or for each individual item, and different coefficients may be generated on a rolling basis for each line or item.

As previously noted, the output of the supply risk early detection model discussed above may be used by IPC 230 in calculating a suitable purchasing plan in the course of performing the method described in FIG. 3. Additionally or alternatively, the model may be used independently for determining supply risks. In either case, however, these detection techniques may involve identifying whether a fulfillment-related feature is sufficiently correlated with a supply risk. To illustrate this procedure, two examples are discussed below.

As a first example, the Welch-Satterthwaite's t-test was used to determine whether a correlation exists between item's age (AGE) and supply risk. It is an adaptation of Student's t-test intended for use with two samples having possibly unequal variances and unequal sample size. It defines the statistic t and the degrees of freedom v associated with this variance estimate by the following formulas:

$$t = \frac{\overline{X}_1 - \overline{X}_2}{\sqrt{\frac{s_1^2}{N_1} + \frac{s_2^2}{N_2}}} \quad \text{Equation (2)}$$

$$v = \frac{\left(\frac{s_1^2}{N_1} + \frac{s_2^2}{N_2}\right)^2}{\frac{s_1^4}{N_1^2 \cdot v_1} + \frac{s_2^4}{N_2^2 \cdot v_2}} = \frac{\left(\frac{s_1^2}{N_1} + \frac{s_2^2}{N_2}\right)^2}{\frac{s_1^4}{N_1^2 \cdot (N_1-1)} + \frac{s_2^4}{N_2^2 \cdot (N_2-1)}}. \quad \text{Equation (3)}$$

where $\overline{X}_i$, $s_i^2$ and $N_i$ are the $i^{th}$ sample mean, sample variance and sample size, respectively.

In this example, let x be the difference between the age of the items with supply constraints and those without supply constraints, and let s be the standard deviation of the difference. Let $\mu$ be the mean difference among the population. Assume 5% significance level ($\alpha$) for the testing, where the significance level ($\alpha$) is a threshold amount of evidence required to accept that an event is unlikely to have arisen by chance.

The hypothesis is that $H_0$: $\mu=0$; and $H_A$: $\mu\neq 0$. Also, the information available to conduct a test of this hypothesis is: $N_1=303,881$ (without supply constraints), $N_2=263,564$ (with supply constraints), $\overline{X}=0.22$ (items with supply constraints have a shorter average age), and $s=0.03$. Because the sample size is larger than 30, central limit theorem applies and it may be assumed that the population of differences is normally distributed. Using Equations (2) and (3) above yields t=24.08, df=505,185 and p-value=0.000000000001, where the "p-value" is the probability of obtaining sample evidence as far away (or further) from the null hypothesis value, if the null hypothesis is really true. Because this p-value (0.000000000001) is smaller than the desired significance level of 0.05, the null hypothesis may be rejected, thus leading to the conclusion that the mean difference between items with supply constraints and without supply constraints is significantly different from zero.

As a second example, a Phi Coefficient Test was used to determine whether a correlation exists between user-defined replenishment code "PR" and supply risk. Generally speaking, the Phi Coefficient Test provides a measure of association for two binary variables. The 4×4 table below (Table III) shows two random binary variables x and y where n11, n10, n01, n00, are non-negative "cell cell counts" that sum to n (the total number of observations)

TABLE III

|       | y = 1    | y = 0    | total   |
|-------|----------|----------|---------|
| x = 1 | $n_{11}$ | $n_{10}$ | $n_{1\bullet}$ |
| x = 0 | $n_{01}$ | $n_{00}$ | $n_{0\bullet}$ |
| total | $n_{\bullet 1}$ | $n_{\bullet 0}$ | n |

Equation (4) below uses the "cell cell counts" to calculate the phi coefficient:

$$\phi = \frac{n_{11}n_{00} - n_{10}n_{01}}{\sqrt{n_{1\bullet}n_{0\bullet}n_{\bullet 0}n_{\bullet 1}}} \quad \text{Equation (4)}$$

Accordingly, the example assigned x be the replenishment code PR (i.e., x=1 means replenishment code is PR, x=0 means replenishment code is not PR), and let y be the groups with or without supply constraints (i.e., y=1 means the item has supply constraints and y=0 means the item doesn't have supply constraints). The contingency table then becomes:

TABLE IV

|       | y = 1   | y = 0   | total   |
|-------|---------|---------|---------|
| x = 1 | 170,601 | 265,922 | 436,523 |
| x = 0 | 34,721  | 8,136   | 42,857  |
| total | 205,322 | 274,058 | 479,380 |

And the calculated the phi coefficient for the replenishment code PR is calculated as −0.24. The range of phi is from −1 to +1, where ±1 indicates perfect agreement or disagreement, and 0 indicates no relationship. In this example, a result of −0.24 indicates there is a negative correlation between the selected user-defined replenishment code and the supply constraints.

A Multi-Constraint Optimization Model

As described above, IPC module 230 may be configured to evaluate a financial cost model or the like to provide a purchasing plan for the item based on business goals and/or operational constraints. To that end, in some embodiments, IPC module 230 may provide a framework for constrained optimization that may be used with a variety of optimization target functions and constraint types. As such, IPC module 230 may provide the infrastructure to find an optimal solution to a financial cost optimization model that seeks to optimize the financial cost to a merchant as a function of inventory held, such that the optimal level of inventory is held for each item (which will result in different critical ratios or "CRs" for each item). In some embodiments, IPC module 230 may optimize cost modes across groups of vendors, such that different CRs may be used for the various sourcing options for a given item, thus resulting in multiple CRs per item. In other embodiments, however, a "fixed" optimization model may be implemented.

Generally speaking, a goal-seeking or optimization process may or may not always guarantee convergence to an absolute solution. For example, an optimization process may exhaustively evaluate a solution space to ensure that the identified solution is the best available. Additionally or alternatively, an optimization process may employ heuristic or probabilistic techniques that provide a bounded confidence interval or other measure of the quality of a solution. For example, an optimization process may be designed to produce a solution that is within at least some percentage of an optimal solution, to produce a solution that has some bounded probability of being the optimal solution, or any suitable combination of these or other techniques.

In some embodiments, IPC module 230 may optimize any target output function known in the art (e.g., a financial cost function, an instock function, an inventory units/cube function, etc.), but subject to a plurality of inequality constraints. The method discussed below is based on the use of Lagrange multipliers as extended by the Karush-Kuhn-Tucker (KKT) conditions to cover inequality constraints, although other suitable techniques may be used. In some cases, IPC module 230 may calculate a mathematical solution to the mode. In other cases, however, especially given the complexities typical of large-scale inventory purchasing systems, IPC module 230 may instead use forecasting and simulation module 260 to search for optimal solutions to each item's inventory position, sum the applicable metrics, validate aggregate constraints across all items in a particular set, and then apply/adjust KKT constants along the gradient of the aggregate search space until either a solution within threshold is found or the magnitude of the gradient falls below threshold and no solution can be reached.

In various embodiments, the model may make use of multiple output dimensions, and constraints may be associated with any number of output dimensions. Restrictions may be placed on the nature of the conditions (as well as on the optimization target function) to ensure a monotonically increasing (or decreasing, as appropriate) objective function (for that output dimension) as the KKT constant increases along that output dimension. For example, aggregate cube decreases monotonically as the cost of cube increases, so the model may allow constraints in the form "cube≤C", where C is a specified constant. By limiting constraints to the set which meets this requirement, the model may both ensure a quick solution search and also limit constraints to those which are reasonable and intelligibly understood in practice. Also, the value of the KKT constant at the constrained optimum suggests the cost of that resource constraint ("shadow price"), which may be thought of in useful real-world terms for sufficiently simple constraint functions.

Let us define an objective function F(CR), where F and CR are vectors. Components of F may be the output dimensions such as, for example, units, instocks, cube, etc. In some embodiments, components of CR may be an item's individually-assigned CR. Alternatively, CR components for various items may be group together into fewer CRs to reduce computational complexity. Further choose one of F's output dimension to maximize or minimize, and define this as $f_{obj}$(CR). Specifically:

$$F(CR): f_i(CR) = \sum_{asin} f_{i,asin}(cr_{asin}) \qquad \text{Equation (5)}$$

Let us also define a set of inequality constraints as G(CR)≤ (0, 0, . . . , 0); all are vectors. Components of G may be the individual constraints, each defined as $g_i$(CR)≤0. In practice, these constraints may be defined such that they maximize reuse of data calculated for F(CR); for example, $g_i$(CR)=: $f_{cube}$(CR)+$C_i$. The number of constraints is not tied to number of output dimensions—i.e., zero or more constraints may apply to each dimension. To implement, we may only allow constraints which meet these requirements (thus excluding constraining on cost, because cost is not monotonically increasing as CRs are increased). Further, $g_i$(CR) may be limited to either $g_i$(CR)=:$f_j$(CR)+$C_i$ or to $g_i$(CR)=:−$f_j$(CR)+$C_i$, for any defined j.

If we define $s_i$ as either −1 or 1, and $h_i$(CR)=:$s_i f_j$(CR), then we can rewrite $g_i$(CR) as $g_i$(CR)=$h_i$(CR)+$C_i$. Since $f_i$(CR) is independent across items and may be rewritten as $f_i$(CR)= $\Sigma_{item}(f_{i,item}$(CR)), we can likewise rewrite $h_i$(CR) as $h_i$(CR)= $\Sigma_{item}(s_i f_{i,item}$(CR))=$\Sigma_{item}(h_{i,item}$(CR)), allowing $g_i$(CR) to be rewritten as $g_i$(CR)=$h_i$(CR)+$C_i$=$\Sigma_{item}(h_{i,item}$(CR))+$C_i$.

Thus, we may attempt to maximize (or minimize) $f_{obj}$(CR) while outputting all of F(CR), subject to constraints G(CR). We may introduce the value function and its associated search variables A=($a_1$, $a_2$, . . . , $a_i$), where A is of the same dimensionality as G:

$$v(CR, A) = f_{obj}(CR) - G(CR) \cdot A \qquad \text{Equation (6)}$$
$$= f_{obj}(CR) - \sum_i a_i g_i(CR)$$

Equation (6) may be rewritten in terms of individual item components of the CR vector:

$$\text{Equation (7)}$$
$$v(CR, A) = \sum_{asin}(f_{obj,asin}(cr_{asin})) - \sum_i a_i g_i(CR)$$
$$= \sum_{asin}(f_{obj,asin}(cr_{asin})) - \sum_i a_i(h_i(CR) + C_i)$$
$$= \sum_{asin}(f_{obj,asin}(cr_{asin})) - \sum_i a_i \left(\sum_{asin}(h_{i,asin}(cr_{asin}) + C_i)\right)$$
$$= \sum_{asin}(f_{obj,asin}(cr_{asin})) - \sum_i a_i \left(\sum_{asin} h_{i,asin}(cr_{asin}) + a_i C_i\right)$$
$$= \sum_{asin}(f_{obj,asin}(cr_{asin})) - \sum_i a_i \sum_{asin} h_{i,asin}(cr_{asin}) + \sum_i (a_i C_i)$$
$$= \sum_{asin}(f_{obj,asin}(cr_{asin})) - \sum_{asin} \sum_i a_i h_{i,asin}(cr_{asin}) + \sum_i (a_i C_i)$$
$$= \sum_{asin} \left(f_{obj,asin}(cr_{asin}) - \sum_i a_i h_{i,asin}(cr_{asin})\right) + \sum_i (a_i C_i)$$

Since each element of CR is independent within v(CR, A), maximizing (or minimizing) CR within v(CR, A) can be done by individually maximizing/minimizing each component (i.e., item) and aggregating the result. Although a maximization technique is used below, in alternative embodiments minimization may be accomplished, for example, by maximizing −$f_{obj}$(CR) without modifying any equation, or by rewriting v(CR, A) as v(CR, A)=$f_{obj}$(CR)+G(CR)·A and modifying all derived equations—e.g., v(A)=min(y(CR, A):y (CR, A)=$f_{obj}$(CR)+$\Sigma_i g_i$(CR)·$a_i$). Correspondingly, crs(A) is defined as the set of CRs which yields the maximal v(A):

$$v(a) = \max\left(y(CR, A) : y(CR, A) = f_{obj}(CR) - \sum_i g_i(CR) \cdot a_i\right) \qquad \text{Equation (8)}$$
$$= \sum_{asin} \max(z(cr_{asin}, A) : z(cr_{asin}, A) = f_{obj,asin}(cr_{asin}) - \sum_i g_{i,asin}(cr_{asin}) \cdot a_i)$$

And crs(A)=CR as used to calculate v(A). As discussed earlier, $g_i$(crs(A)) is monotonic (or constant) with respect to each dimension in A; not just its own corresponding dimension. Intuitively, this means that as we increase the cost of one resource (e.g., sortable space), the other constraints are consistently affected (e.g., instocks monotonically decrease; nonsortable space is unaffected). This may be shown to hold as long as each constraint is itself monotonic with respect to CR input changes:

$$z(cr_{asin}, A) = f_{obj,asin}(cr_{asin}) - \sum_i g_{i,asin}(cr_{asin}) \cdot a_i \quad \text{Equation (9)}$$

$$dz(cr_{asin}, A)/da_i = -g_{i,asin}(cr_{asin})$$

$$dz(cr_{asin}, A)/dg_i = -a_i$$

v(A) is defined as the max of $z(A)=f_{obj}(CR)-\Sigma_i g_i(CR) \cdot a_i$. The maximum of this function will be found somewhere for the initial point. After applying a delta to $a_i$, the maximum will shift proportionally to $g_i(CR)$ at the CRs that achieved the previous maximum.

If $a_i$ is positive, then the influence of $g_i(CR)$ on $z(A)$ will increase. If the slope of $g_i(CR)$ is positive, then the maximum will be found with lower CRs, and $g_i(CR)$ will decrease. In other words, $dg_i(CR)/dCR>0 \Rightarrow dCR/da_i<0$ and $dg_i(CR)/dai<0$. Note that it does not imply anything about the change in v(A), as this is dependent on the sign of $g_i(CR)$, which we allow to be both positive and negative for searching purposes. If the slope of $g_i(CR)$ is negative, then the maximum will be found with higher CRs, and $g_i(CR)$ will still decrease: $dg_i(CR)/dCR<0 \Rightarrow dCR/da_i>0$ and $dg_i(CR)/da_i<0$. Thus, $a_i>0 \Rightarrow dg_i(CR)/da_i<0$.

On the other hand, if $a_i$ is negative, then the influence of $g_i(CR)$ on $z(A)$ will decrease. If the slope of $g_i(CR)$ is positive, then the maximum will be found with higher CRs, and $g_i(CR)$ will increase $(dg_i(CR)/da_i>0)$. If the slope of $g_i(CR)$ is negative, then the maximum will be found with lower CRs, and $g_i(CR)$ will still increase $(dg_i(CR)/da_i>0)$. Thus, $a_i<0 \Rightarrow dg_i(CR)/da_i>0$.

If a search space is restricted to cases where $a_i>0$ for each $a_i$ in A, it is assured that the $g_i(CR)$ functions in G are each monotonic with respect to constraint changes (for all constraints, if all are held to be positive, as the above logic may be applied to any changing constraint).

In some embodiments, various different algorithms may be developed for use with the multiple constraint optimization model described herein. Examples of such algorithms include an "outer" constrained value optimization, a revised outer constrained value optimization, and an "inner" unconstrained CR optimization. These algorithms are described in turn below. In other embodiments, however, other gradient-based search algorithms may be used.

Generally speaking, the "outer" constrained optimization is designed to explore a search space defined by constraint multipliers, starting them all out at zero. If all the constraints are met at that point, the algorithm may use that solution. Otherwise, the algorithm may move along the gradient until conditions are met, then move back to avoid unnecessary constraints and find the overall best solution that meets all constraints. More specifically, the "outer" constrained optimization algorithm may be implemented as the following sequence of operations:

1. Start the constraint search at $A=(0, 0, \ldots, 0)$; define a goal_threshold (in terms of percent change from trial to trial) as the goal condition; define delta1 and delta2 and corresponding annealing functions. Start previous_best_goal as undefined.

2. Perform one unconstrained optimization on v(CR, A), searching for set of CRs that maximizes (or minimizes) v.

3. If $G(CR) \leq (0, 0, \ldots, 0)$ (i.e., all constraints are satisfied), then this is the optimal choice of CRs (stop here). The value of F(CR) at this point may be taken as the simulation outputs.

4. Move A proportional to the gradient of failed dimensions in G(CR) (re-call the G(CR) is the gradient of v(CR, A). Define $H:h_i(CR)=\max(g_i(CR), 0)$. Adjust A such that A+=H·delta1, where delta1 is some small value that should likely decrease over successive runs (simulated annealing). Optionally, normalize H first. Decrement delta1 per annealing algorithm. If we dip below the smallest allowed delta1, then return the previous_best_goal (defined in operation 7), if any, else fail the optimization.

5. Perform one unconstrained optimization at the new point.

6. If at least one constraint in G(CR) remains unsatisfied, then go to operation 4 and repeat.

7. If previous_best_goal is undefined, or if F(CR) is better than previous best goal, then record previous_best_goal=F(CR) and store CR and A.

8. Scale down A:A*=(1.0−delta2). Decrement delta2 per annealing algorithm. If we dip below the smallest allowed delta2, then return the previous best goal (defined in operation 7), if any, else fail the optimization.

9. Perform one unconstrained optimization at the new point.

10. If at least one constraint is now failed, go to operation 4.

11. If F(CR) is worse than previous best goal (may happen, for example, if simulation variance is the dominant factor), then go to operation 8.

12. If abs(1.0−F(CR)|previous_best_goal)≤threshold, then stop. Return F(CR) and present values of CR and A.

13. Replace previous best goal with F(CR), and store the associated CR and A values.

14. Go to operation 8.

In contrast with the "outer" constrained optimization algorithm outlined above, a revised outer constraint optimization algorithm may assume that a pure gradient search is guaranteed to find a global maximum, as provided by the following operations:

1. Start the constraint search at $A=(0, 0, \ldots, 0)$; define a goal_threshold (in terms of percent change from trial to trial) as the goal condition; define delta1 and delta2 and corresponding annealing functions. Start previous_best_goal as undefined.

2. Perform one unconstrained optimization on v(CR, A), searching for set of CRs that maximizes (or minimizes) v.

3. If $G(CR) \leq (0, 0, \ldots, 0)$ (i.e., all constraints are satisfied), then this is the optimal choice of CRs (stop here). The value of F(CR) at this point may be taken as the simulation outputs.

4. Move A proportional to the gradient of v(CR, A), which is G(CR). Adjust A such that A+=G·delta1, where delta1 is some small value that should likely decrease over successive runs (simulated annealing). Decrement delta1 per annealing algorithm. If we dip below the smallest allowed delta1, then return the previous_best_goal (defined in operation 7), if any, else fail the optimization.

5. Perform one unconstrained optimization at the new point.

6. If at least one constraint in G(CR) remains unsatisfied, then go to operation 4 and repeat.

7. If previous_best_goal is undefined, or if F(CR) is better than previous_best_goal, then record previous_best_goal=F(CR) and store CR and A.

8. If abs(1.0−F(CR)|previous_best_goal)≤threshold, then stop. Return F(CR) and present values of CR and A.

9. Go to operation 4.

In some embodiments, as an alternative to both constrained optimization algorithms described above, an "inner" unconstrained CR optimization may be used. In this case, the function to be maximized is v(CR, A). Whereas the constrained optimization algorithms passes in settings for A, the unconstrained CR optimization outlined below calculates the CRs which maximize the value function:

1. Choose num_demand_trials as a number of individual demand simulations per item. Choose num_cr_search_trials as a number of initial points to explore on each CR vs. value curve.

2. Calculate num_demand_trials data points for demand for the selected item throughout the entire optimization/simulation period; store this persistently such that every simulation of the item uses the same demand data (including across separate runs of this inner algorithm within the above overall algorithm). An optional extension may include using rationalized random points rather than true random points. To do so, we may divide 1.0 by num_demand_trials, and simulate one random point within each such range. For example, with 10 trials, we may pick one random point in the [0.00, 0.10) range, one point in [0.10, 0.20) range, etc.

3. If this is the first time this item has been run through this inner algorithm, distribute num_cr_search_trials points randomly across [0.0, 1.0) (optionally per above rationalization algorithm), and num_demand_trials simulation iterations through the entire optimization period for the selected item and record the mean of the resulting outputs in F(CR), as well as v(CR, A). Store the F(CR) points persistently, as they may be needed for future evaluations as A changes across runs of this inner algorithm. If this is a subsequent run of the algorithm, simply use all pre-calculated points as initial data points (calculating a new value for v(CR, A) with the new A values at each point).

4. Do a binary (or n-ary) search around any peaks identified in the initial evaluation to narrow down on a precise maximal point and store these points persistently.

5. Repeat operations 2-4 for each item in the simulation, and aggregate the resulting outputs as F(CR) and v(CR, A).

6. Return the resulting best CR, F(CR), and v(CR, A).

When implementing the multiple constraint optimization model, forecasting and simulation module 260 may be configured or modified to simulate a time range for a given item independently of other items. This may be achieved in a parallelized way such that all items may be quickly simulated for a given trial. Furthermore, the target output or objective function may be defined in any suitable manner. For example, a financial cost optimization model may seek to minimize a cost to a merchant subject to instock constraints, or the like. Additionally or alternatively, a fixed-equivalent model may aim to maximize instock subject to an inventory on-hand units constraint.

An Illustrative Computer System

In some embodiments, some or all of the methods or techniques described above may be implemented as program instructions and data capable of being stored or conveyed via a computer-accessible medium. Such methods or techniques may include, for example and without limitation, the functions of IPC module 230 and any suitable variations thereof. Such program instructions may be executed to perform a particular computational function, such as inventory health metric generation and analysis, expiring item removal analysis, purchase offer analysis, purchase and/or sales management, operating system functionality, applications, and/or any other suitable functions.

Figure 20:
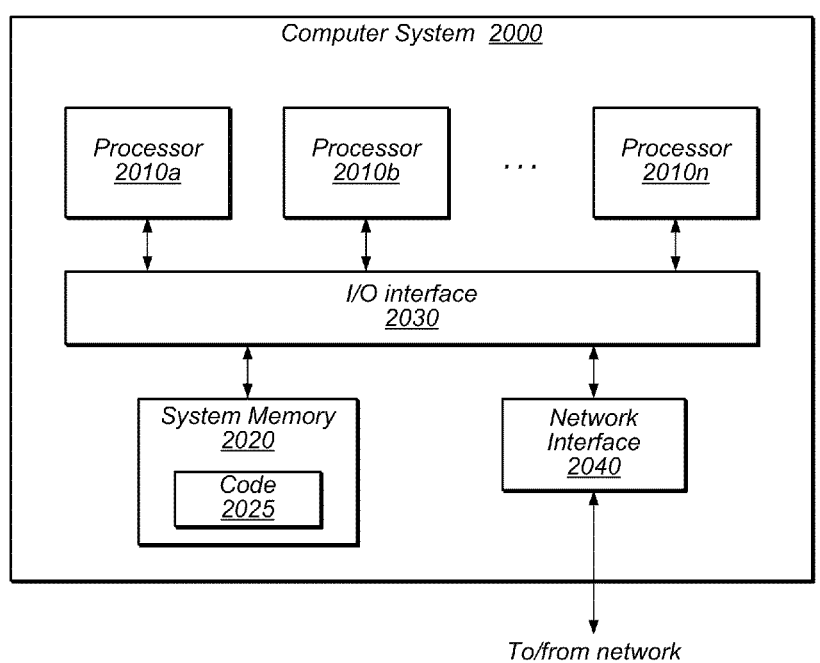
FIG. 20 is a block diagram a computer system according to some embodiments.

An embodiment of a computer system including computer-accessible media is illustrated in FIG. 20. In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, IPC module 230 may be implemented using a single instance of computer system 2000, while in other embodiments multiple such systems may be configured to host different portions or thereof. For example, in an embodiment some data sources or services (e.g., purchasing management services) may be implemented via instances of computer system 2000 that are distinct from those instances implementing other data sources or services (e.g., order entry/fulfillment services).

In various embodiments computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be a general-purpose or embedded processor implementing any of a variety of instruction set architectures (ISAs), such as the x2020, PowerPC®, SPARC®, or MIPS ISAs, or any other suitable ISA. In multiprocessor systems, each of processors 2010 may commonly, but not necessarily, implement the same ISA.

System memory 2020 may be configured to store instructions and data accessible by process 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 2020 as code 2025.

In an embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, for example. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 2020 may be an embodiment of a computer-accessible medium configured to store program instructions and data as described above. However, in other embodiments, program instructions and/or data may be received, sent or stored upon different types of computer-accessible media. Generally speaking, a computer-accessible medium may include tangible storage media or memory media such as magnetic or optical media, e.g., disk or CD/DVD-ROM coupled to computer system 2000 via I/O interface 2030. A computer-accessible medium may also include any volatile or non-volatile media such as RAM (e.g., SDRAM, DDR SDRAM, RDRAM, SRAM, etc.), ROM, etc, that may be included in some embodiments of computer system 2000 as system memory 2020 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

Additionally, some or all of the methods or techniques described above and illustrated, for example, in FIGS. 3-5 may be implemented as a web service that may be performed on behalf of clients requesting such a service. Generally speaking, providing a function or service as a web service may encompass providing any of a variety of standardized APIs configured to allow different software programs to communicate (e.g., to request services and respond to such requests) in an autonomous, web-based and typically platform-independent manner. For example, an enterprise may choose to expose certain enterprise data (e.g., catalog data, inventory data, customer data or other types of data) and/or certain enterprise functions (e.g., query functions, electronic commerce functions, generic data storage or computational functions, etc.) to external customers (or, in some embodiments, internal clients) via a web services interface. Applications could then access the exposed data and/or functions via the web services interface, even though the accessing application may be configured to execute on an entirely different platform (e.g., a different operating system or system architecture) than the platform hosting the exposed data or functions. Similarly, an enterprise may elect to provide clients with access to inventory management analysis services, such as inventory health determination, expiring product analysis, purchase offer analysis, counteroffer analysis or other such services. For example, clients may provide inventory details via a web services interface and request various kinds of analysis through that interface. Alternatively, an enterprise may elect to provide physical management of inventory on behalf of clients, and may analyze client-owned inventory in a manner similar to enterprise-owned inventory, exposing the results of such analysis to clients as a web service.

In some embodiments, provisioning a web service may encompass the use of particular protocols which may be executable (e.g., as part of code 2025) to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in an embodiment a provider of a web service may register the service using a version of the Universal Discovery Description and Integration (UDDI) protocol, which may function as a general directory through which potential resource users may locate web services of interest. The web service provider may also publish specific details regarding how a well-formed web services request from a user should be formatted (e.g., what specific parameters are required or allowed, the data type or format to be used for a given parameter, etc.). For example, such interface details may be published (e.g., within a UDDI directory entry) using a version of the Web Services Description Language (WSDL).

In some embodiments, web services request and response data is exchanged between a client and the service provider through the use of messages or documents formatted as platform-independent structured data, such as a document formatted in compliance with a version of eXtensible Markup Language (XML). For example, in an embodiment a web services request to provide inventory health information for a given inventory item may be embodied in an XML document including fields identifying the item of interest, the type of data requested (e.g., inventory health data), and possibly other fields, in which each field is delimited by an XML tag describing the type of data the field represents. The response to such a request from the web service provider may include an XML document containing the requested data. In certain embodiments, web services-related documents may be transmitted between applications making requests and targeted web services using a web-based data transfer protocol, such as a version of the Hypertext Transfer Protocol (HTTP), for example.

Different types of web services requests and responses may yield XML documents that bear little content in common, which may complicate the handling and interpretation of such documents. For example, in different versions of a free-form XML document specifying a web services request, the actual web service that is requested may appear at different places within different document versions, which may require a recipient of the document to buffer or parse a good deal of document data before understanding what the document is for. Consequently, in some embodiments, the XML documents containing web services request/response data may encapsulated within additional XML data used to define a messaging framework, e.g., a generic format for exchanging documents or messages having arbitrary content. For example, in an embodiment web services requests or responses may be XML documents formatted according to a version of the Simple Object Access Protocol (SOAP), which in various versions may define distinct document sections such as an "envelope" (e.g., which may include a specification of the document type, the intended recipient web service, etc.) as well as a message body that may include arbitrary XML message data (e.g., the particular details of the web services request). However, in some embodiments, web services may be implemented using different protocols and standards for publishing services and formatting and exchanging messages.

Additionally, in some embodiments, a web services system may be implemented without using document-based techniques such as SOAP-type protocols. For example, as an alternative to a document-based approach, a web service may be implemented using a Representational State Transfer (REST)-type architecture. Generally speaking, in REST-type architectures, web services requests may be formed as commands conveyed via a transport protocol, such as PUT or GET commands conveyed via a version of the HTTP protocol. Those parameters of the request that might be embedded within a document in a document-based web services architecture may instead be included as command parameters in a REST-type architecture. Other suitable configurations of web services architectures are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
performing, by one or more computers:
correlating a supply constraint of an item to be supplied from a supplier to a fulfillment entity's inventory with fulfillment-related features of the item to determine a subset of the fulfillment-related features, wherein at least some of the fulfillment-related features are demand-side features pertaining to fulfillment of the item from the fulfillment entity's inventory, said correlating comprising:
identifying the fulfillment-related features corresponding to the item to be supplied to the fulfillment entity's inventory;
selecting the subset of the fulfillment-related features based, at least in part, on a determination that the subset of the fulfillment-related features of the item to be fulfilled from the fulfillment entity's inventory is correlated with the supply constraint associated with the item from the supplier and that another subset of the fulfillment-related features is unrelated to the supply constraint, wherein the supply constraint includes at least one of a purchase order rejection, a purchase order cancellation, a purchase order backorder, or a partial receipt, and wherein the determination is based at least in part on historical supply constraint data;
building a supply risk early detection model based, at least in part, upon the subset of fulfillment-related features of the item to be fulfilled from the fulfillments entity's inventory;
evaluating the supply risk early detection model to determine a probability that the supplier will suffer a shortage in the supplier's inventory of the item, wherein the supplier's inventory is separate from the fulfillment entity's inventory, and to determine an expected duration of the shortage; and
creating a purchasing plan for the item based at least in part on:
the probability of the supplier's shortage,
the expected duration of the supplier's shortage,
an associated cost of buying additional units of the item, and
an associated cost of not having sufficient supply of the item to serve an expected demand for the item.

2. The method of claim 1, wherein the fulfillment-related features include a supplier identity.

3. The method of claim 1, wherein the fulfillment-related features include at least one of an item identity or a release date of the item.

4. The method of claim 1, wherein the fulfillment-related features include a quantity of the item to be purchased.

5. The method of claim 1, wherein the fulfillment-related features include a velocity with which the item is sold to customers.

6. The method of claim 1, wherein the fulfillment-related features include a user-defined replenishment code associated with the item.

7. The method of claim 1, wherein the fulfillment-related features include a prior supply constraint.

8. The method of claim 1, wherein selecting the subset of fulfillment-related features includes calculating a correlation coefficient for each feature of the subset of fulfillment-related features.

9. The method of claim 1, wherein the supply risk early detection model includes a logistical regression model, and wherein an exponent of the logistical regression model includes a linear combination of two or more features of the subset of fulfillment-related features.

10. The method of claim 1, wherein creating the purchasing plan includes modifying an existing purchasing plan.

11. A system, comprising:
at least one processor; and
a memory coupled to the at least one processor, wherein the memory stores program instructions, and wherein the program instructions are executable by the at least one processor to cause the system to:
correlate a supply constraint of an item to be supplied from a supplier to a fulfillment entity's inventory with fulfillment-related features of the item to determine a subset of the fulfillment-related features, wherein at least some of the fulfillment-related features are demand-side features pertaining to fulfillment of the item from the fulfillment entity's inventory, said correlate comprising:
identify the fulfillment-related features corresponding to the item to be purchased from a supplier by a merchant;
select the subset of the fulfillment-related features based, at least in part, on a determination that the subset of the fulfillment-related features of the item to be fulfilled from the fulfillment entity's inventory is correlated with the supply constraint associated with the item from the supplier and that another subset of the fulfillment-related features is unrelated to the supply constraint, wherein the determination is based at least in part on historical supply constraint data, and wherein the supply constraint includes at least one of a purchase order rejection, a purchase order cancellation, a purchase order backorder, or a partial receipt;
build a model configured to calculate a probability of the supplier stocking out of the item and an expected duration of the stockout based, at least in part, upon the subset of fulfillment-related features; and
create a purchasing plan for the item that takes into account:
the probability of the stockout,
the expected duration of the stockout,
an associated cost of buying additional units of the item, and
an associated cost of not having sufficient supply of the item to serve an expected demand for the item.

12. The system of claim 11, wherein the fulfillment-related features include a supplier identity and an item identity.

13. The system of claim 11, wherein the fulfillment-related features include at least one of a quantity of the item to be purchased by the merchant, a velocity with which the item is sold to the merchant's customers, or a user-defined replenishment code associated with the item.

14. The system of claim 11, wherein the model includes a logistical regression model, and wherein an exponent of the logistical regression includes a linear combination of two or more features of the subset of fulfillment-related features.

15. A non-transitory computer-readable storage medium having program instructions stored thereon that, upon execution by a computer system, cause the computer system to:
evaluate a model configured to calculate a probability of a supplier stocking out of an item in the supplier's inventory and determine an expected duration of the stockout based, at least in part, upon a set of fulfillment-related features corresponding to the item, wherein the set of fulfillment-related features is selected based on a determination that each feature of the set is correlated with a supply constraint of an item to be supplied from a supplier to a fulfillment entity's inventory and that each feature of another set is unrelated to the supply constraint, wherein the supplier's inventory is separate from the fulfillment entity's inventory, wherein at least some of the fulfillment-related features are demand-side features pertaining to fulfillment of the item from the fulfillment entity's inventory, wherein the determination is based at least in part on historical supply constraint data, and wherein the supply constraint includes at least one of a purchase order rejection, a purchase order cancellation, a purchase order backorder, or a partial receipt; and create a purchasing plan for the item based at least in part on:
  the probability of the supplier's stockout,
  the expected duration of the supplier's stockout,
  an associated cost of buying additional units of the item, and
  an associated cost of not having sufficient supply of the item to serve an expected demand for the item.

16. The non-transitory computer-readable storage medium of claim 15, wherein the set of fulfillment-related features includes a supplier identity, an item identity, a quantity of the item to be purchased by the fulfillment entity, a velocity with which the item is sold to the fulfillment entity's customers, or a user-defined replenishment code associated with the item.

17. The non-transitory computer-readable storage medium of claim 15, wherein the model includes a logistical regression model, and wherein an exponent of the logistical regression includes a linear combination of two or more features of the set of fulfillment-related features.

18. The non-transitory computer-readable storage medium of claim 15, wherein creating the purchasing plan includes modifying an existing purchasing plan.

* * * * *